(12) United States Patent
Ruch et al.

(10) Patent No.: US 8,697,792 B2
(45) Date of Patent: Apr. 15, 2014

(54) MIGRATION-FREE COLOURED COPOLYCONDENSATES FOR COLOURING POLYMERS

(75) Inventors: Thomas Ruch, Delemont (CH); Thomas Eichenberger, Basel (CH); Peter Sutter, Sissach (CH); Christoph Krebs, Pratteln (CH); Ursula Luterbacher, Reinach (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/496,530

(22) PCT Filed: Sep. 15, 2010

(86) PCT No.: PCT/EP2010/063503
§ 371 (c)(1),
(2), (4) Date: Mar. 16, 2012

(87) PCT Pub. No.: WO2011/036075
PCT Pub. Date: Mar. 31, 2011

(65) Prior Publication Data
US 2012/0172529 A1    Jul. 5, 2012

(30) Foreign Application Priority Data
Sep. 24, 2009 (EP) .................................. 09171173

(51) Int. Cl.
| | | |
|---|---|---|
| *D06G 5/00* | (2006.01) | |
| *C08K 5/03* | (2006.01) | |
| *C08K 5/092* | (2006.01) | |
| *C08G 73/10* | (2006.01) | |
| *C08G 63/682* | (2006.01) | |
| *C08G 63/685* | (2006.01) | |
| *C08G 63/688* | (2006.01) | |

(52) U.S. Cl.
USPC ............ 524/464; 528/322; 528/363; 528/364

(58) Field of Classification Search
USPC ................................. 525/167; 528/292, 290
See application file for complete search history.

(56) References Cited

U.S. PATENT DOCUMENTS

| | | | |
|---|---|---|---|
| 4,116,923 A | | 9/1978 | Gattner |
| 5,523,387 A | * | 6/1996 | Goldmann et al. ........... 534/728 |
| 6,001,936 A | | 12/1999 | Barrera et al. |
| 6,103,006 A | | 8/2000 | DiPietro |
| 6,462,128 B1 | * | 10/2002 | Barashkov et al. ........... 524/597 |
| 6,706,855 B1 | | 3/2004 | Collins et al. |
| 7,087,677 B2 | | 8/2006 | Kaul et al. |
| 2005/0080189 A1 | * | 4/2005 | Waters et al. ................. 525/165 |

FOREIGN PATENT DOCUMENTS

| | | | |
|---|---|---|---|
| CA | 2169713 A1 | * | 8/1996 |
| EP | 0634524 A1 | | 1/1995 |
| EP | 728745 A1 | * | 8/1996 |
| EP | 1172418 A2 | | 1/2002 |
| WO | 99/21937 A1 | | 5/1999 |
| WO | 9938916 A1 | | 8/1999 |
| WO | 0117356 A1 | | 3/2001 |
| WO | 02066483 A1 | | 8/2002 |
| WO | 2005080189 A2 | | 3/2005 |

OTHER PUBLICATIONS

Charvat (Coloring of Plastics vol. I Fundamentals) 2nd Edition, 2004, p. 111.*
CAS Record for DE102008036495A1.*
A. Whiting, Dyes and Pigments, vol. 52 (2002) pp. 137-143.

* cited by examiner

*Primary Examiner* — Randy Gulakowski
*Assistant Examiner* — Christopher M Rodd
(74) *Attorney, Agent, or Firm* — Tyler A. Stevenson

(57) ABSTRACT

The invention relates to colored and/or fluorescent copolycondensates which are obtained by reaction of colorants substituted by at least two reactive groups which do not interfere with one another, with selected cyclic dicarboxylic acids (especially 1,4-cyclohexanedicarboxylic acid), aliphatic diols (especially ethylene glycol), cyclic diamines (especially isophoronediamine) and/or amino acids in particular amounts.

21 Claims, No Drawings

MIGRATION-FREE COLOURED COPOLYCONDENSATES FOR COLOURING POLYMERS

The invention relates to coloured, especially blue, red and preferably fluorescent, migration-free copolycondensates which are obtained by reaction of colourants substituted by at least two reactive groups which do not interfere with one another, with selected dicarboxylic acids, diols, diamines and/or amino acids.

Coloured and fluorescent colourants cause problems in the bulk colouring of semicrystalline polymers, especially those for applications which come into contact with the skin and/or with foods, for example packaging.

Fluorescence is displayed satisfactorily only when there is no interaction between the colourant molecules. When the fluorescent colourant is in pigmentary form, the photoexcited state is deactivated (quenched) by energy transfer processes within the crystalline particles, which prevents luminescence. It has now been found that, surprisingly, this is also the case to a certain degree when the molecules of the fluorescent colourant are incorporated in a partly crystalline, polymeric protective shell.

The situation is similar for the colour strength and colour saturation of colourants. Pigmentary particles are often more light-stable than dissolved dyes, but they do not attain the desired highly saturated hues to the desired degree.

On the other hand, virtually all colourants in dissolved form lead to a high degree of undesired migration. The colourant can collect at the surface of the substrate, which can lead to colouring of the environment (especially of the contents of packaging) and/or to exudation (with simultaneous quenching and absorption by the skin when touched). Migration is visually unappealing in particular in the case of fluorescent, red and blue colourants, since it is then perceived as particularly significant by the human eye.

There have already been many proposals to control migration, but this has been possible to date only to a not entirely satisfactory degree, and/or with undesired reduction and/or a spectral shift in the fluorescence.

U.S. Pat. No. 4,116,923 discloses low-melting coloured polyesters which can be obtained from terephthalic or isophthalic acid, primary alkanetriols and coloured esters. However, these coloured polyesters no longer meet the present high demands for applications in customary packaging polymers.

WO 99/21 937 discloses that the migration of colourants is slowed by introduction of a polymerizable group.

U.S. Pat. No. 6,103,006 discloses polymeric pigments which are obtained by copolymerization of 1H,3H—Z-benzopyrano[6,5,4-mna]xanthene-1,3-dione (3,4-benzoxanthenedicarboxylic anhydride "BXDA") with a bifunctional carboxylic acid, a bifunctional amine and optionally a bifunctional alcohol. Isophoronediamine, ethylene glycol and cyclohexanedicarboxylic acid are mentioned, but preferred dicarboxylic acids are phthalic acid, isophthalic acid and terephthalic acid. In all examples, the dialcohol used is cyclohexanedimethanol, and isophthalic acid is additionally always used as the dicarboxylic acid with the exception of example 20. These pigments should purportedly have increased lightfastness, but they have been found to be insufficiently migration-free and/or to have not entirely satisfactory fluorescence.

WO 01/17 356 discloses antimicrobial polymers, including a polymer obtained from hexamethylenediamine, hexamethylenebis(cyanoguanidine) and N-(6-aminohexyl)-4-(6-aminohexylamino)-1,8-naphthalimide.

WO 02/066 483 discloses dye monomers substituted by a methacrylate group, and the use thereof for preparing olefin copolymers.

Dyes and Pigments 52, 137-143 [2002] discloses fluorescent polyurethane foams which comprise N-(5-hydroxypentyl)-4-(5-hydroxypentylamino)-1,8-naphthalimide, N-(11-hydroxyundecyl)-4-(11-hydroxyundecylamino)-1,8-naphthalimide or 4-butylamino-N-(1,3-dihydroxy-2-propyl)-1,8-naphthalimide as a colourant. According to this article, there is no migration, but fluorescence is very weak or at least weaker than with the nonpolymerizable colourant N-pentyl-4-pentylamino-1,8-naphthalimide.

WO 2005/019 523 discloses polymeric colourants which are obtained by copolymerization of chromophores containing two reactive groups with a bifunctional carboxylic acid, a bifunctional amine and optionally a bifunctional alcohol. The diol used is 90% cyclohexanedimethanol, the typical secondary component of cyclohexanedimethanol being methanol. However, it has been found that these polymeric colourants too do not fully satisfactorily meet the present high demands with regard to heat stability, freedom from migration and fluorescence.

It has now been found that, surprisingly, very satisfactorily to entirely migration-free coloured copolycondensates are obtained when colourants substituted by at least two separate reactive substituents are reacted with a narrow selection of particular copolymerizable components. The coloured or fluorescent copolycondensates thus obtained feature high migration fastnesses and glass transition temperatures in the range favourable for application purposes. In addition, they have good general fastnesses, especially usually elevated thermal and light stabilities, and also excellent stability with respect to the contents of packaging (especially foods or constituents thereof, such as fat, salt, vinegar and sugars), and with respect to aggressive environmental factors, such as oxygen, water vapour, ozone, carbon monoxide, sulphur dioxide and/or nitrogen oxides.

The invention therefore relates to a copolycondensate obtainable by copoly-condensation of at least one 1,2-$C_4$-$C_8$cycloalkanedicarboxylic acid, 1,3-$C_4$-$C_8$cycloalkane-dicarboxylic acid or 1,4-$C_4$-$C_8$cycloalkanedicarboxylic acid, or an ester, anhydride or acid chloride thereof;

from 0.3 to 0.8 mol, preferably from 0.4 to 0.8 mol, more preferably from 0.5 to 0.7 mol, based on 1 mol of $C_4$-$C_8$cycloalkanedicarboxylic acid, of at least one 1,2-$C_6$-$C_{12}$cycloalkanediamine, 1,3-$C_6$-$C_{12}$cycloalkanediamine or 1,4-$C_6$-$C_{12}$cycloalkanediamine, or of a latent form thereof;

from 0.2 to 0.6 mol, preferably from 0.3 to 0.5 mol, based on 1 mol of $C_4$-$C_8$cycloalkanedicarboxylic acid, of at least one 1,2-$C_2$-$C_6$alkanediol, 1,3-$C_2$-$C_6$alkanediol or 1,4-$C_2$-$C_6$alkanediol, of which from 0 to 0.05 mol of one hydroxyl group may be esterified with a monocarboxylic acid, where the $C_2$-$C_6$alkanediol may be uninterrupted or interrupted by —O—, with the proviso that no carbon atom of the $C_2$-$C_6$alkanediol is bonded to more than one oxygen atom;

optionally from 0 to 0.1 mol, preferably 0 or from 0.01 to 0.05 mol, based on 1 mol of $C_4$-$C_8$cycloalkanedicarboxylic acid, of one or more amino acids;

optionally from 0 to 0.1 mol, preferably from 0 to 0.05 mol, more preferably from 0 to 0.02 mol, based on 1 mol of $C_4$-$C_8$cycloalkanedicarboxylic acid, of one or more monofunctional components selected from the group consisting of monoalcohols, primary monoamines and monoacids each containing from 1 to 18 carbon atoms; and from 0.001 to 0.15 mol, preferably from 0.001 to 0.01 mol, more preferably from 0.002 to 0.05 mol, most preferably from 0.01 to 0.03 mol, based on 1 mol of $C_4$-$C_8$cycloalkanedicarboxylic acid, of at least one colourant which has at least two substituents selected from the group consisting of —X, —$NH_2$, —COX, —$SO_2$X, —CO—O—CO— and —$SO_2$—O—$SO_2$—, where X is hydroxyl or reactive chlorine, bromine, fluorine, iodine or nitro, with the proviso that at least two of these substituents must be removed from one another to such an extent that they are not condensable with one another to form a fewer than 10-membered intramolecular ring;

with the proviso that the molar ratio of the total amount of all hydroxyl and primary amino groups or latent forms thereof to the total amount of all carboxyl and sulpho groups is from 5:4 to 4:5, preferably from 9:8 to 8:9.

In a preferred embodiment, the molar ratio of the total amount of all hydroxyl groups and primary amino groups or latent forms thereof to the total amount of all carboxyl or sulpho groups is based on all components which are converted to the copolycondensate by the copolycondensation. In particular, the molar ratio of the total amount of all hydroxyl groups and primary amino groups or latent forms thereof to the total amount of all carboxyl or sulpho groups is based on all components, which are employed as starting material for the copolycondensation and are foreseen to be incorporated into the copolycondensate.

Preference is given to a copolycondensate obtainable by copolycondensation of
at least one 1,2-$C_4$-$C_8$cycloalkanedicarboxylic acid, 1,3-$C_4$-$C_8$cycloalkane-dicarboxylic acid or 1,4-$C_4$-$C_8$cycloalkanedicarboxylic acid, or an ester, anhydride or acid chloride thereof;
from 0.3 to 0.8 mol, based on 1 mol of $C_4$-$C_8$cycloalkanedicarboxylic acid, of at least one 1,2-$C_6$-$C_{12}$cycloalkanediamine, 1,3-$C_6$-$C_{12}$cycloalkanediamine or 1,4-$C_6$-$C_{12}$cycloalkanediamine, or of a latent form thereof;
from 0.2 to 0.6 mol, based on 1 mol of $C_4$-$C_8$cycloalkanedicarboxylic acid, of at least one 1,2-$C_2$-$C_6$alkanediol, 1,3-$C_2$-$C_6$alkanediol or 1,4-$C_2$-$C_6$alkanediol, of which from 0 to 0.05 mol of one hydroxyl group may be esterified with a monocarboxylic acid, where the $C_2$-$C_6$alkanediol may be uninterrupted or interrupted by —O—, with the proviso that no carbon atom of the $C_2$-$C_6$alkane-diol is bonded to more than one oxygen atom;
optionally from 0 to 0.1 mol, based on 1 mol of $C_4$-$C_8$cycloalkanedicarboxylic acid, of one or more amino acids;
optionally from 0 to 0.1 mol, based on 1 mol of $C_4$-$C_8$cycloalkanedicarboxylic acid, of one or more monofunctional components selected from the group consisting of monoalcohols, primary monoamines and monoacids each containing from 1 to 18 carbon atoms; and
from 0.001 to 0.15 mol, based on 1 mol of $C_4$-$C_8$cycloalkanedicarboxylic acid, of at least one colourant which has at least two substituents selected from the group consisting of —X, —$NH_2$, —COX, —$SO_2$X, —CO—O—CO— and —$SO_2$—O—$SO_2$—, where X is hydroxyl or reactive chlorine, bromine, fluorine, iodine or nitro, with the proviso that at least two of these substituents must be removed from one another to such an extent that they are not condensable with one another to form a fewer than 10-membered intramolecular ring;
with the proviso that the molar ratio of the total amount of all hydroxyl and primary amino groups or latent forms thereof to the total amount of all carboxyl and sulpho groups is from 5:4 to 4:5.

Preference is given to a copolycondensate obtainable by copolycondensation of
at least one 1,2-$C_4$-$C_8$cycloalkanedicarboxylic acid, 1,3-$C_4$-$C_8$cycloalkane-dicarboxylic acid or 1,4-$C_4$-$C_8$cycloalkanedicarboxylic acid, or an ester, anhydride or acid chloride thereof;
from 0.5 to 0.7 mol, based on 1 mol of $C_4$-$C_8$cycloalkanedicarboxylic acid, of at least one 1,2-$C_6$-$C_{12}$cycloalkanediamine, 1,3-$C_6$-$C_{12}$cycloalkanediamine or 1,4-$C_6$-$C_{12}$cycloalkanediamine, or of a latent form thereof;
from 0.3 to 0.5 mol, based on 1 mol of $C_4$-$C_8$cycloalkanedicarboxylic acid, of at least one 1,2-$C_2$-$C_6$alkanediol, 1,3-$C_2$-$C_6$alkanediol or 1,4-$C_2$-$C_6$alkanediol, of which from 0 to 0.05 mol of one hydroxyl group may be esterified with a monocarboxylic acid, where the $C_2$-$C_6$alkanediol may be uninterrupted or interrupted by —O—, with the proviso that no carbon atom of the $C_2$-$C_6$alkane-diol is bonded to more than one oxygen atom;
optionally from 0 to 0.05 mol, based on 1 mol of $C_4$-$C_8$cycloalkanedicarboxylic acid, of one or more amino acids;
optionally from 0 to 0.02 mol, based on 1 mol of $C_4$-$C_8$cycloalkanedicarboxylic acid, of one or more monofunctional components selected from the group consisting of monoalcohols, primary monoamines and monoacids each containing from 1 to 18 carbon atoms; and
from 0.01 to 0.03 mol, based on 1 mol of $C_4$-$C_8$cycloalkanedicarboxylic acid, of at least one colourant which has at least two substituents selected from the group consisting of —X, —$NH_2$, —COX, —$SO_2$X, —CO—O—CO— and —$SO_2$—O—$SO_2$—, where X is hydroxyl or reactive chlorine, bromine, fluorine, iodine or nitro, with the proviso that at least two of these substituents must be removed from one another to such an extent that they are not condensable with one another to form a fewer than 10-membered intramolecular ring;
with the proviso that the molar ratio of the total amount of all hydroxyl and primary amino groups or latent forms thereof to the total amount of all carboxyl and sulpho groups is from 9:8 to 8:9.

Particularly advantageous substituents of the colourants used in accordance with the invention are chlorosulphonyl, 4-chloro-3-oxo-2-azabutyl (chloroacetaminomethyl), 3,5-dicarboxyphenyl (containing 2 reactive carboxyl groups) and the combination of a halogen and of a carboxyl, hydroxyl or amino group bonded to the chromophore of the colourant by an aliphatic chain containing at least 4 members, which members preferably consist of groups selected from methylene, oxy, carbonyl, sulpho and amino.

At least one reactant with particular functional groups, independently of the reactants with other kinds of functional groups, in each case means, for example, one or more, for example from 2 to 12, compounds with the same functional groups, each one of which can be added individually or as a mixture of two or more reactants with the same functional groups.

A colourant is understood to mean a substance which has a molar absorption coefficient $K_n \geq 1\cdot 10^4$ $l\cdot mol^{-1}\cdot cm^{-1}$ at a wavelength in the range between 400 and 700 nm, or emits radiation absorbed in the range from 300 to 400 nm with a molar absorption coefficient $Kn \geq 1\cdot 10^{-4}$ $l\cdot mol^{-1}\cdot cm^{-1}$ in the form of luminescence in the range between 400 and 700 nm.

Preference is given in accordance with the invention to luminescent yellow colourants which have an absorption maximum in the range from 300 to 500 nm and luminescence in the range between 400 and 700 nm, to red colourants which have an absorption maximum in the range between 500 and 600 nm, and to blue colourants which have an absorption maximum in the range from 600 to 700 nm.

Particularly suitable colourants contain at least one substructure

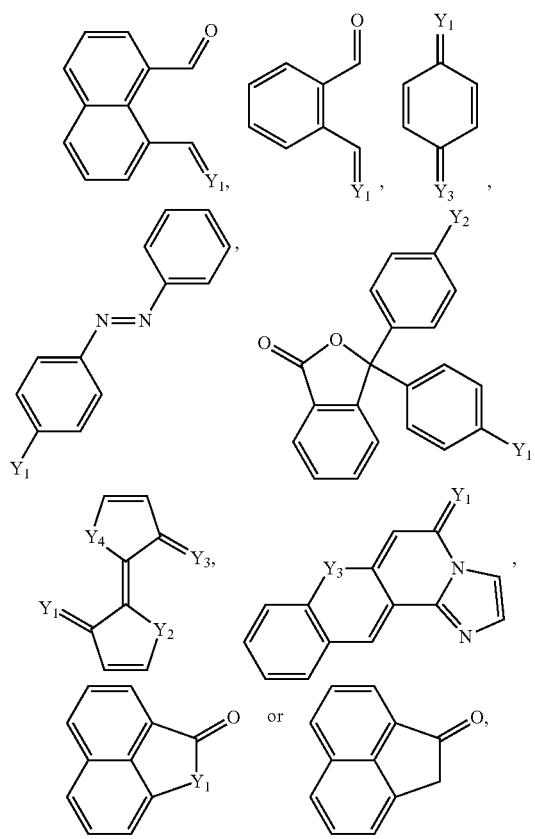

in which $Y_1$ and $Y_2$ are each independently O or N—, and $Y_3$ and $Y_4$ are each independently O, N— or S, preferred colourants having the substructures

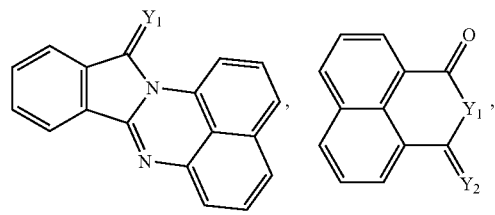

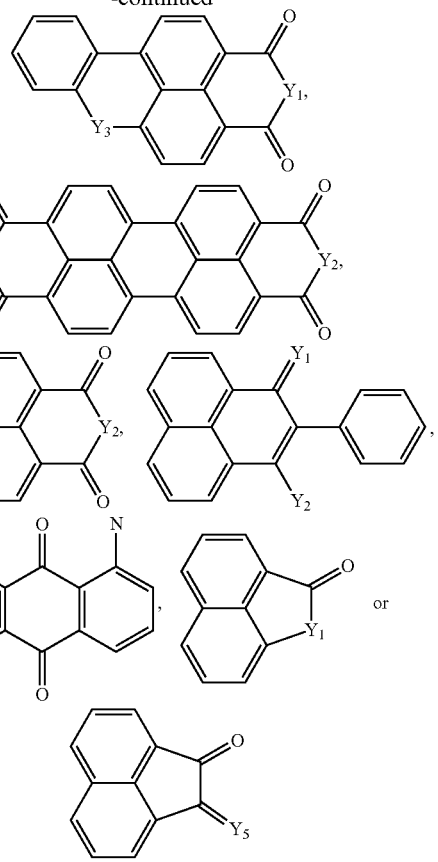

in which $Y_1$ to $Y_4$ are each as defined above and $Y_5$ is —C— or N—.

Substructures of the formula

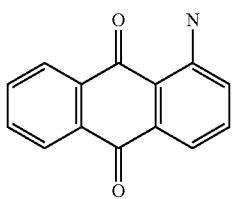 [SMILES: Nc1cccc2c1C(=O)c1ccccc1C2=O]

are preferably substructures of the formula

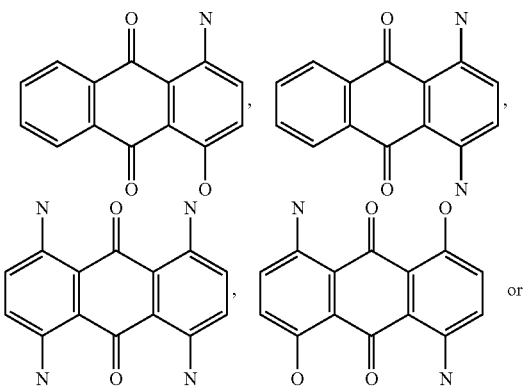

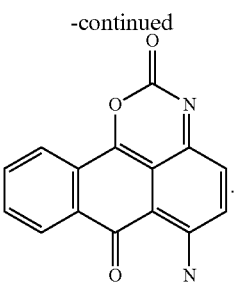

Both in the case of the colourants for use, which have reactive groups, and in the case of the inventive copolycondensates obtained, the quantum yield of the luminescence is preferably independently a value of at least 0.01, more preferably a value of at least 0.1.

"At least two substituents" in the colourant generally means 2, 3 or 4 substituents, though a higher number of substituents is also possible, for example from 5 to 10 substituents. It has been found that, surprisingly, substituents which can condense intramolecularly with one another to form a 3- to 9-membered ring do not react irreversibly in the copolycondensation to give the desired copolycondensates, but rather form by-products which lead to undesired migration. This should therefore be avoided to a better degree. Particularly unfavourable substituents are those which condense to give 5- and 6-membered intramolecular rings, especially those in the 1,2 or 1,3 arrangement on an aliphatic or alicyclic radical, in the 1,2 arrangement on a benzene radical or in the 1,8 arrangement on a naphthalene radical, which forms, for example, the following undesired substructures:

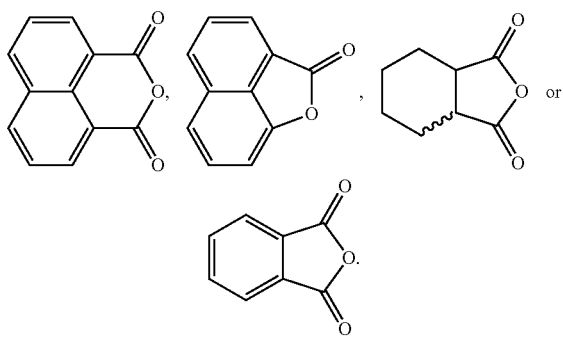

If, however, at least one further substituent which is not intramolecularly condensable is present, intramolecularly condensable substituents are generally not disruptive. Preference is given, nevertheless, to at least two further substituents which are not intramolecularly condensable.

Reactive chlorine, bromine, fluorine or iodine is understood for example to mean a chlorine, bromine, fluorine or iodine atom which reacts, in the absence of a catalyst or in the presence of not more than 1 mol % of trifluoroacetic acid or 1,5-diazabicyclo[4.3.0]non-5-ene (DBU), based on the amount of substance containing reactive chlorine, bromine, fluorine or iodine, with ethylene glycol (1,2-ethanediol) at 198° C. to eliminate chloride, bromide, fluoride or iodide respectively.

Reactive nitro groups typically have electronic activation, for example by means of further substitution with o- or p-substituents, such as carbonyl, carboxyl, and so forth. A typical case of an activated, reactive nitro group is 4-nitro-1,8-naphthoic anhydride.

The molar ratio of the total amount of all hydroxyl and primary amino groups or latent forms thereof to the total amount of all carboxyl and sulpho groups is more preferably from 20:19 to 19:20, most preferably from 50:49 to 49:50.

The copolycondensate is preferably prepared essentially exclusively from the reactants specified. However, it is also possible to add further components in a nondisruptive amount, in which case the total amount of any further components should appropriately not exceed 10% by weight, based on the entirety of the reactants specified above, and the amount of condensable hydroxyl, amino, carboxyl and sulpho groups should not exceed 10 mol %, based on the entirety of the same groups present in the reactants specified above. However, it has been found that, surprisingly, amino alcohols and polyhydroxyl compounds having more than 2 hydroxyl groups often have an unfavourable effect on the properties of the copolycondensate, and the amount thereof should preferably not exceed 5 mol %, based on the entirety of all hydroxyl groups.

The copolycondensation can be performed in one or more steps, it being possible for each of the reactants to be present fully or partly from the outset or else to be added fully or partly at any time in the copolycondensation, for example during any step or between any two steps. The more reactive reactants, especially $C_6$-$C_{12}$cycloalkanediamines, are preferably added in a delayed manner. The reactants are more preferably metered in a regular manner during the co-polycondensation.

The two carboxyl groups in the cycloalkanedicarboxylic acid may be cis or trans with regard to the cycloalkane ring. Preference is given to a mixture of cis and trans stereoisomers, either in the D or L form or as a racemate. The cycloalkane-dicarboxylic acid may be mono- or bicyclic, unbranched or branched, and unsubstituted or substituted, especially esterified with methyl, ethyl, unbranched or branched $C_3$-$C_8$alkyl or $C_3$-$C_8$cycloalkyl, preference being given to $C_1$-$C_4$alkyl such as methyl, ethyl, n-propyl, isopropyl, n-butyl, isobutyl, sec-butyl or tert-butyl. Particular preference is given to cis- or trans-cyclohexanedicarboxylic acid and the stereoisomer mixture thereof.

When a $C_4$-$C_8$cycloalkanedicarboxylic ester is used, it is appropriate to use a customary esterification catalyst (for example dibutyltin laurate, sulphuric acid, trifluoroacetic acid or the anhydride thereof), and to perform the co-polycondensation until at least 95% of the ester groups are cleaved and removed from the reaction mixture, for example by distillation of the alcohol formed. Any further substituents of the $C_4$-$C_8$cycloalkanedicarboxylic acid may, for example, be halogen or oxo.

The two amino groups in the $C_6$-$C_{12}$cycloalkanediamine are appropriately primary. They may be cis or trans based on the cycloalkane ring. Preference is given to a mixture of cis or trans stereoisomers, either in the D or L form or as a racemate. The $C_6$-$C_{12}$cycloalkanediamine may be mono- or bicyclic, unbranched or branched, and unsubstituted or substituted. Particular preference is given to 1,2-cyclohexanediamine and isophoronediamine, very particular preference to cis-isophoronediamine and cis/trans-isophoronediamine mixtures, especially those in which the cis form predominates. The $C_6$-$C_{12}$cycloalkanediamine may optionally also be initially charged in a known latent form, from which the amino groups are released thermally and/or under acid catalysis, in which case one or both amino groups may be substituted, for example, by tert-butoxycarbonyl (BOC protecting group).

The $C_2$-$C_6$alkanediol may be unbranched or branched and unsubstituted or substituted, but is generally not cyclic. Particular preference is given to ethylene glycol, propylene glycol, 1,3-propanediol, 1,4-butanediol and diethylene glycol, very particular preference to ethylene glycol. Optionally, a portion of the $C_2$-$C_6$-alkanediol may be esterified with a monocarboxylic acid, in which case the amount of monocarboxylic acid needed for esterification should be included in the amount of free monocarboxylic acid.

The optional amino acid may be an aminocarboxylic acid or aminosulphonic acid, which may be aromatic or preferably aliphatic or alicyclic, where aliphatic or alicyclic species may each be unbranched or branched. In particular, the amino acid may be a compound of the formula $H_2N$-A-COOH or $H_2N$-A-$SO_3H$, in which A is $C_6H_4$ or $G_1$-$G_2$-$[G_3]_n$, $G_1$, $G_2$ and $G_3$ are each independently $(CH_2)_2$, $CH_2O$, $CH_2NH$, $COCH_2$, $CO_2$, CONH, $SO_2CH_2$, $SO_3$ or $SO_2NH$, and n is 0, 1 or 2, with a total number of carbon atoms in G1, G2 and G3 of from 2 to 8.

The optional monofunctional components may serve as end groups in the copoly-condensate. Since end groups do not significantly affect the properties of the co-polycondensate given this small total amount of monofunctional components, the monoalcohols, primary monoamines and monoacids may in principle have any desired structures provided that they do not contain more than 18 carbon atoms. More particularly, the compounds may be those of the formula T-OH, T-$NH_2$, T-COOH or T-$SO_3H$, where T is an organic radical containing 18 carbon atoms. T may be aliphatic, alicyclic, heterocyclic, mono- or polyunsaturated, aromatic/aliphatic (aralkyl), aromatic/alicyclic, aromatic or heteroaromatic, where aliphatic or alicyclic species may each be unbranched or branched, and aliphatic species or a plurality of aromatic or heteroaromatic rings may be uninterrupted or interrupted from 1× to 8× by —O—, —NH—, —N, —CO—, —S— or —$SO_2$—, with the provisos that no carbon atom of T is singly bonded to more than one interrupting oxygen or nitrogen atom, and no two —O— are bonded directly to one another (i.e. excluding peroxides), and where T is unsubstituted or substituted by uncondensable substituents.

The inventive copolycondensates generally have an advantageous glass transition temperature ($T_g$) of 60 to 200° C. The glass transition temperature ($T_g$) of the inventive copolycondensates is preferably in the range from 80 to 180° C., more preferably in the range from 100 to 160° C.

The inventive copolycondensates are appropriately obtained by heating the reactants of the copolycondensation, optionally in the presence of a preferably acidic catalyst, to approximately 50 to 300° C. over the course of 1 s to 100 hours. The higher the temperature, the shorter the reaction time necessary. The rule of thumb is that the reaction rate approximately doubles when the temperature increases by 10° C. Appropriately, volatile components formed, such as water, alcohols, ethers or esters, are removed by means of gravity or distillation from the reaction mixture. The copolycondensation can be affected under standard pressure or else optionally under reduced or elevated pressure, for example from $10^2$ to $10^7$ Pa, preferably from $10^4$ to $10^6$ Pa.

The copolycondensation can be affected in the absence of any additional inert medium, in which case the desired product solidifies in the course of cooling, and the solid formed can, for example, be ground. It is, however, also possible to perform the copolycondensation in the presence of an inert medium, in which case the desired product is obtained in pulverulent form and is, for example, filtered or centrifuged, and can optionally be washed with water or with other non-dissolving solvents, (for example benzene and other aromatics (such as toluene or chlorobenzene), acetonitrile or aliphatic hydrocarbons). The amount of any additional inert medium is appropriately from 0 to 5000% by weight, based on the total weight of the inventive reactants of the copolycondensate.

Acidic catalysts are, for example, Brønsted acids or Lewis acids, such as organic acids or mineral acids (for example hydrogen chloride, phosphoric acid, sulphuric acid, acetic acid or propionic acid), or else esterification and transesterification catalysts (for example organic metal salts). The amount of any catalyst is preferably from 0.001 to 10% by weight, based on the total weight of the inventive reactants of the copolycondensate.

The inert media used are appropriately substances which are liquid at the reaction temperature, for example solvents which are typically used as solvents in organic synthesis, such as hexafluoroisopropanol, N-methylpyrrolidone or N,N-dimethylformamide. It is preferable, however, not to use any inert medium. The reaction is preferably performed under inert gas, such as nitrogen or argon.

Irrespective of the presence or absence of a solvent, the copolycondensation can be performed batchwise or continuously. Short reaction times at high temperatures can be achieved, for example, in flow microreactors. A preferred co-polycondensation method is the performance of the copolycondensation in an extruder, in which case all of the reactants can be metered in continuously in the intake zone, or else one or more thereof can be metered in continuously in different zones. The volatile components formed can be removed by means of gravity or distillation in zones equipped therefore in a manner known per se, optionally also together with the inert medium or a portion thereof. The desired product can optionally be pelletized or allowed to solidify in fibrous form directly downstream of the extruder, and ground.

In a particularly efficient version, in the case of use of an extruder, the desired co-polycondensate, immediately after formation thereof, can be incorporated into a polymeric substrate, which may be metered into the extruder, preferably after the copolycondensation zone. This allows, for example, masterbatches to be coloured without migration in a very simple manner.

In another, likewise very efficient version, in the case of use of an extruder, a softened or molten polymer can be used as the reaction medium. For this purpose, the polymer to be coloured is metered into the intake zone of the extruder, and the reactants of the copolycondensation either in the same intake zone, or in one or more downstream zones where the polymer has already softened or melted. In this case, the product formed is appropriately isolated in the form of granules, which can be processed further in the customary manner in this form or as a masterbatch.

It is possible to add customary additives in customary concentrations to the inventive copolycondensates, either before or during the precipitation or isolation, to improve the application properties.

The inventive copolycondensates are outstandingly suitable for bulk colouring of polymers, especially semicrystalline polymers. They are very satisfactorily to entirely free of migration and have high fluorescence without undesired colour shifts. The inventive copolycondensates are particularly suitable for bulk colouring of polyolefins, such as polyethylene, polypropylene, polybutene, polyisobutene, poly(4-methyl-1-pentene), polystyrene and copolymers of α-olefins; of partly crystallizing thermoplastics, especially of acrylate resins, such as poly(methyl acrylate), poly(ethyl acrylate), poly(isopropyl acrylate), poly(butyl acrylate), poly-(isobutyl acrylate), poly(2-ethylhexyl acrylate), or copolymers of acrylic and/or methacrylic esters with styrene and/or vinyl esters, of polyesters including polycarbonates, such as polyglycolides, polylactides, poly(β-hydroxybutyric acid), poly(4-hydroxybenzoic acid), poly(ε-caprolactone), polyethylene terephthalate, polybutylene terephthalate, poly(1,4-cyclohexanedimethylene terephthalate), poly(4-hydroxybenzoic acid) or other polyarylates, unsaturated polyester resins, and of polyamides including polyaramids, such as poly(ε-caprolactam), polyhexamethyleneadipamide, polyhexamethylenesebacamide, polyhexamethylenedodecanamide, polyphthalamides with aliphatic members, poly(terephthalic acid-p-phenylenediamine), poly(isophthalic acid-m-phenylenediamine); or of rigid-chain polymers, such as poly-p-phenylene, polyimides or ionomers (for example Surlyn (®, DuPont), Naflon®, Thionic® or EEA Copolymer®).

Apart from bulk colouring of polymers, the inventive copolycondensates are also suitable for colouring other high molecular weight organic materials, for example in the form of coating materials or printing inks, or else, for example, for production of solid toners, wax transfer ribbons or colour filters.

The high molecular weight organic material to be coloured in accordance with the invention may be of natural or synthetic origin and typically has a molecular weight in the range from $10^3$ to $10^8$ g/mol. It may, for example, comprise natural resins or drying oils, rubber or casein, or modified natural substances, such as chloro rubber, oil-modified alkyd resins, viscous, or cellulose ethers or esters, such as cellulose acetate, cellulose propionate, cellulose acetobutyrate or nitro-cellulose, but especially fully synthetic organic polymers (both thermosets and thermoplastics), as obtained by polymerization, polycondensation or polyaddition, for example polyolefins such as polyethylene, polypropylene or polyisobutylene, substituted polyolefins such as polymers of vinyl chloride, vinyl acetate, styrene, acrylonitrile, acrylic and/or methacrylic esters, or butadiene, and copolymers of the monomers mentioned, especially ABS or EVA.

From the group of the polyaddition resins and polycondensation resins, mention should be made of the condensation products of formaldehyde with phenols, known as phenol resins, and the condensation products of formaldehyde with urea, thiourea and melamine, known as amino resins, the polyesters used as paint resins, both saturated polyesters such as alkyd resins and unsaturated polyesters such as maleate resins, and also the linear polyesters and polyamides or silicones.

The high molecular weight compounds mentioned may be present individually or in mixtures, as plastic mixtures or melts, which may optionally be spun to fibres.

They may also, in the form of monomers thereof or in the polymerized state, be in dissolved form as film formers or binders for coating materials or printing inks, such as linseed oil varnish, nitrocellulose, alkyd resins, melamine resins, urea-formaldehyde resins or acrylic resins.

The high molecular weight organic substances are coloured with the inventive copolycondensates, for example, by adding such a copolycondensate, optionally in the form of masterbatches, to these substrates using roll mills or mixing or grinding apparatus. The coloured material is then generally converted to the desired final form by processes known per se, such as calendering, pressing, extruding, painting, casting, or by injection moulding. It is often desirable to produce non-rigid mouldings, or to reduce the brittleness thereof, to incorporate plasticizers into the high molecular weight compounds before the shaping thereof. The plasticizers used may, for example, be esters of phosphoric acid, phthalic acid or sebacic acid. The plasticizers may be incorporated into the polymers in the process according to the invention before or after the incorporation of the inventive copolycondensate into the polymers. It is also possible, for the purpose of achieving different shades, also to add fillers or other constituents, such as white, coloured or black pigments, and also inorganic luminophores (e.g. zinc oxide), metallic or goniochromatic effect pigments (e.g. aluminium flakes or coated mica), to the high molecular weight organic substances in the amounts desired in each case, in addition to the inventive copolycondensates.

For colouring of coating materials and printing inks, the high molecular weight organic materials and the inventive copolycondensates, optionally together with additives such as fillers, other colourants, siccatives or plasticizers, are generally finely dispersed or dissolved in an organic and/or aqueous solvent or solvent mixture. The procedure may be to disperse or dissolve the individual components alone, or else two or more together, and only then to combine all components.

A further embodiment therefore also relates to bulk-coloured high molecular weight organic material comprising
(a) 0.05 to 70% by weight, based on the sum of (a) and (b), of an inventive co-polycondensate, and
(b) 99.95 to 30% by weight, based on the sum of (a) and (b), of a high molecular weight organic material.

The material may be either a ready-to-use composition or article shaped therefrom, or else a masterbatch, for example in the form of pellets. Optionally, the high molecular weight organic material coloured in accordance with the invention may also comprise customary additives, for example stabilizers.

A further embodiment therefore also relates to a process for bulk colouring of high molecular weight organic material, characterized in that an inventive co-polycondensate is incorporated therein, for example by mixing and processing the high molecular weight organic material with the inventive copolycondensate, optionally in the form of a masterbatch, in a manner known per se.

The examples which follow illustrate the invention without restricting the scope thereof (unless stated otherwise, "%" is always % by weight):

Test Methods

The glass transition temperature ($T_g$) is measured according to ASTM standard D-3418.

Heat resistance: highest temperature with $\Delta E^* < 3$ after residence time 5 minutes (compared to blanks at 200° C. for 2 minutes).

Migration (to DIN 53775, part 3): migration-free corresponds to $\Delta E^* = 4.9$-$5.0$ grey scale.

Test Specimens

PVC:

A PVC film of thickness ~0.3 mm, containing 0.2% by weight of copolycondensate, is produced on a twin-roll mill at 150-160° C.

"Rolled" HDPE:

An HDPE film of thickness ~0.3 mm, containing 1% by weight of copolycondensate, is produced by mixing the copolycondensate with M 80063S HDPE pellets from Sabic Corp., extruding on a single-shaft extruder at 220° C. and then rolling on a chill roll (rolls 1+2 90° C., roll 3 chilled).

"Rolled" LDPE:

An LDPE film of thickness ~0.5 mm, containing 1% copolycondensate, is produced by mixing the copolycondensate with Lupolen 1840D LDPE powder (®, Lyondell-Basell) and then rolling on a twin-roll mill at 150° C. for 5 minutes.

Injection-Moulded HDPE:

Injection-moulded HDPE blanks of thickness ~1.5 mm, containing 1% by weight of copolycondensate, are produced by mixing the copolycondensate with M 80063S HDPE powder from Sabic Corp., extruding twice through a twin-shaft extruder at 200° C., and then injection-moulding (Boy A 30).

Injection-Moulded Polypropylene:

Injection-moulded PP blanks of thickness ~1.5 mm, containing 1% copolycondensate, were produced by mixing the copolycondensate with RD360 MO PP pellets from Borealis Corp., extruding through a twin-shaft extruder at 200° C. and then injection-moulding (Boy A 30).

EXAMPLE 1

A 500 ml glass flask with propeller stirrer, thermometer, dropping funnel and gas inlet is initially charged with 124.0 g (0.713 mol) of 1,4-cyclohexanedicarboxylic acid (99%), which are stirred slowly and heated to 195° C. After the acid has melted, 4.0 g (0.011 mol) of compound of the formula

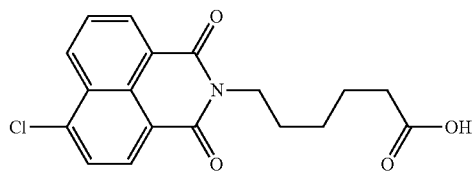 [SMILES: O=C(O)CCCCCN1C(=O)c2cccc3c(Cl)ccc(c23)C1=O]

(preparable from 4-chloro-1,8-naphthoic anhydride and 6-aminohexanoic acid) are added. Under nitrogen, 72.0 g (0.423 mol) of isophoronediamine (Aldrich≥99%, racemic mixture of cis and trans isomers) and 19.2 g (0.303 mol) of ethylene glycol (98%) are then added dropwise within 20 minutes. The reaction mixture is stirred at 210° C. for 3 hours (550 rpm, in the course of which the speed declines slightly after 2 hours owing to an increase in the viscosity). The viscous material is poured out and left to solidify. The brittle solidified material is ground by means of a rotor mill. 187.1 g of a fine, yellow-fluorescing powder with a glass transition temperature ($T_g$) of ~141° C. (ASTM D-3418) are obtained. HDPE coloured with 1% of this powder is absolutely free of migration, and the colour is heat-resistant up to 300° C. ($\Delta E^* < 3$); the light stability thereof after 50 hours of xenon light exposure (Atlas Weather-O-meter) is 3-4 on the grey scale.

EXAMPLE 2

0.4 g (0.001 mol) of the compound of the formula

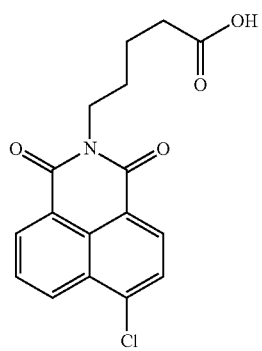 [SMILES: O=C(O)CCCCN1C(=O)c2cccc3c(Cl)ccc(c23)C1=O]

(preparable from 4-chloro-1,8-naphthalic anhydride and 6-aminohexanoic acid according to Example 5 of EP 0 728 745) is added to a mixture of 12.4 g (0.071 mol) of 1,4-cyclohexanedicarboxylic acid (Aldrich 99%), 6.0 g (0.035 mol) of isophoronediamine (Aldrich 99%) and 2.4 g (0.038 mol) of ethylene glycol (Fluka puriss), and the reaction mixture is stirred under nitrogen flow at 220° C. over the course of 3 hours. The viscous material is then poured out and solidified, and is ground by means of a rotor mill. This results in 16.9 g of a fine, yellow-fluorescing powder ($T_g$=~142° C.). HDPE coloured with 1% of this powder is migration-free, and the colour is heat-resistant up to 300° C.

EXAMPLE 3

A 300 ml sulphonation flask is initially charged with 3.7 g (0.015 mol) of 4-chloro-1,8-naphthalic anhydride (ABCR, 94%) and 5.5 g (0.029 mol) of 5-aminoisophthalic acid (Aldrich 94%) in 70 ml of propionic acid (Fluka purum), which are heated to 130° C. After 3 hours, another 2.4 g (0.012 mol) of 5-aminoisophthalic acid and 50 ml of propionic acid are added thereto, and the mixture is stirred at 120° C. for a further 18 h. The reaction mixture is then cooled to 50° C. and poured onto 500 ml of a 3:1 methanol/water mixture. The product is filtered off, washed with water and dried at 70° C./5·10³ Pa. This results in 5.3 g of a pale beige powder of the formula

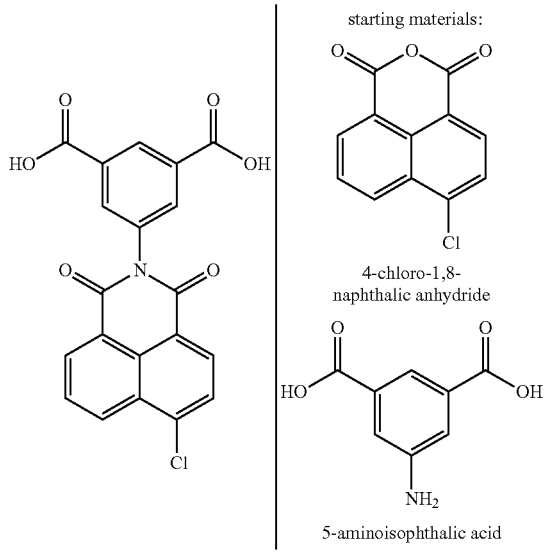 [SMILES: O=C(O)c1cc(C(=O)O)cc(N2C(=O)c3cccc4c(Cl)ccc(c34)C2=O)c1 ; Nc1cc(C(=O)O)cc(C(=O)O)c1 ; O=C1OC(=O)c2ccc(Cl)c3cccc1c23]

(MS/LDI-TOF: M=395).

EXAMPLE 4

The procedure is analogous to Example 2, except that the dye according to Example 3 is used. 17 g of a fine, yellow-fluorescing powder are obtained. HDPE coloured with 1% of this powder is migration-free, and the colour is heat-resistant up to 300° C.

EXAMPLE 5

A 200 ml sulphonation flask is initially charged with 6.1 g (0.025 mol) of 4-chloro-1,8-naphthalic anhydride (ABCR, 94%) and 6.6 g (0.056 mol) of 1,6-hexamethylenediamine (Aldrich 98%) in 80 ml of ethanol (Fluke puriss), and they are heated to reflux. The mixture is stirred at 70° C. for a further 18 hours. The reaction mixture is cooled, and the crude material is filtered off and recrystallized twice in 300 ml of ethanol each time. The product is filtered off, washed with ethanol and water and dried at 80° C./5·10³ Pa. This results in 4.7 g of pale beige powder which, according to ¹H NMR spectroscopy, has the following structure:

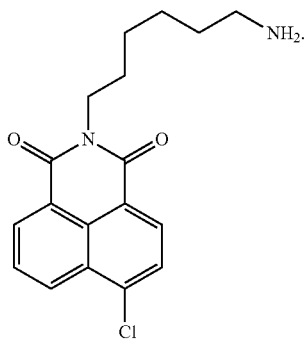 [SMILES: NCCCCCCN1C(=O)c2cccc3c(Cl)ccc(c23)C1=O]

EXAMPLE 6

The procedure is analogous to Example 2, except that the dye according to Example 5 is used. 17.3 g of a fine, yellow-fluorescing powder are obtained. HDPE coloured with 1% of this powder is migration-free, and the colour is heat-resistant up to 300° C.

EXAMPLE 7

In a 100 ml sulphonation flask, 0.51 g (0.002 mol) of 4-chloro-1,8-naphthalic anhydride (ABCR, 94%) and 0.54 g (0.005 mol) of 1,6-hexamethylenediamine (Aldrich 98%) are stirred slowly under nitrogen and heated to 130° C. The reaction mixture turns yellow with time. After stirring for one hour, 18.6 g (0.107 mol) of 1,4-cyclohexanedicarboxylic acid, 8.3 g (0.048 mol) of isophoronediamine and 3.6 g (0.057 mol) of ethylene glycol are added thereto, and the mixture is heated to 200° C. and stirred for one hour. It is then heated to 220° C. and stirred for a further 2 hours. The viscous material is then poured out and solidified, and is ground by means of a rotor mill. This results in 25.3 g of a fine, yellow-fluorescing powder. HDPE coloured with 1% of this powder is migration-free, and the colour is heat-resistant up to 300° C.

EXAMPLE 8

Analogously to Example 7, 0.51 g (0.002 mol) of 4-chloro-1,8-naphthalic anhydride (ABCR, 94%) and 0.48 g (0.005 mol) of 5-amino-1-pentanol (Sigma 97%) are stirred slowly under nitrogen and heated to 130° C. The reaction mixture turns yellow with time. After stirring for one hour, 18.6 g (0.107 mol) of 1,4-cyclohexanedicarboxylic acid, 8.3 g (0.048 mol) of isophoronediamine and 3.6 g (0.057 mol) of ethylene glycol are added thereto, and the mixture is heated to 200° C. and stirred for one hour. It is then heated to 220° C. and stirred for a further 2 hours. The viscous material is then poured out and solidified, and is ground by means of a rotor mill. This results in 25 g of a fine, yellow-fluorescing powder ($T_g$=~131° C.). HDPE coloured with 1% of this powder is migration-free, and the colour is heat-resistant up to 300° C.

EXAMPLE 9

Analogously to Example 7, 0.51 g (0.002 mol) of 4-chloro-1,8-naphthalic anhydride (ABCR, 94%) and 8.3 g (0.048 mol) of isophoronediamine are stirred slowly under nitrogen and heated to 130° C. The reaction mixture turns yellow with time. After stirring for one hour, 18.6 g (0.107 mol) of 1,4-cyclohexanedicarboxylic acid and 3.6 g (0.057 mol) of ethylene glycol are added thereto, and the mixture is heated to 200° C. and stirred for a further 4 hours. The viscous material is then poured out and solidified, and is ground. This results in 24.9 g of a fine, yellow-fluorescing powder ($T_g$=~134° C.). HDPE coloured with 1% of this powder is migration-free, and the colour is heat-resistant up to 300° C.

EXAMPLE 10

Analogously to Example 7, 0.51 g (0.002 mol) of 4-chloro-1,8-naphthalic anhydride (ABCR, 94%) and 0.6 g (0.004 mol) of 6-amino-hexanecarboxylic acid (Aldrich 98.5%) are stirred slowly under nitrogen, and heated to 130° C. The reaction mixture turns yellow with time. After stirring for 1 hour, 18.6 g (0.107 mol) of 1,4-cyclohexanedicarboxylic acid, 8.25 g (0.048 mol) of isophoronediamine and 3.6 g (0.057 mol) of ethylene glycol are added thereto, and the mixture is heated to 200° C. and stirred for one hour. It is then heated to 220° C. and stirred for a further 2 hours. The viscous material is then poured out and solidified, and is ground by means of a rotor mill. This results in 25.6 g of a fine, yellow-fluorescing powder. HDPE coloured with 1% of this powder is migration-free, and the colour is heat-resistant up to 300° C.

EXAMPLE 11

In a 350 ml sulphonation flask, 124.0 g (0.720 mol) of 1,4-cyclohexanedicarboxylic acid and 4.0 g (0.010 mol) of the compound of the formula

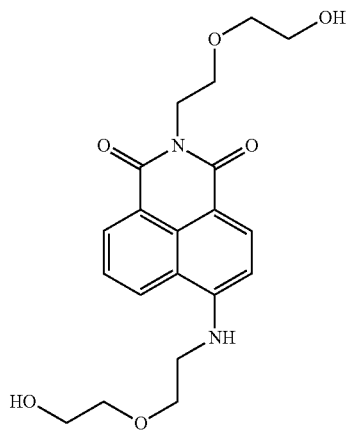 [SMILES: O=C1c2cccc3c(NCCOCCO)ccc(c23)C(=O)N1CCOCCO]

(preparable from 4-chloro-1,8-naphthalic anhydride and 2-(2-aminoethoxy)ethanol according to Bioorganic & Medicinal Chemistry 14(9), 2935-2941 [2006]) are stirred slowly with admission of nitrogen and heated to 195° C. with an oil bath. After the acid has melted, a mixture of 60.0 g (0.349 mol) of isophoronediamine and 24.0 g (0.387 mol) of ethylene glycol is added dropwise within 30 minutes. The mixture is stirred under nitrogen at 210° C. for a further 3 hours. The viscous material is then poured out and solidified, and is ground by means of a rotor mill. This results in 180.2 g of a fine, yellow-fluorescing powder ($T_g$=~134° C.). HDPE coloured with 1% of this powder is migration-free, and the colour is heat-resistant up to 300° C.

EXAMPLE 12

The procedure is analogous to Example 11, except that the dye of the formula

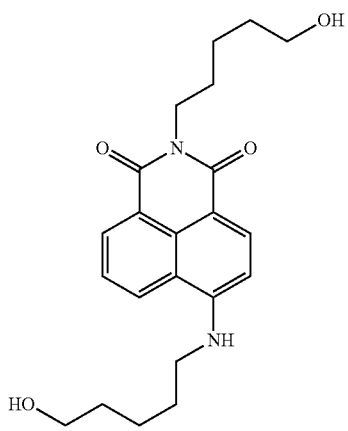 [SMILES: O=C1c2cccc3c(NCCCCCO)ccc(c23)C(=O)N1CCCCCO]

(preparable from 4-chloro-1,8-naphthalic anhydride and 6-aminopentanol, cf. Dyes and Pigments 52(2), 137-143 [2002]) is used. This results in 180.2 g of a fine, yellow-fluorescing powder ($T_g$=~144° C.). HDPE coloured with 1% of this powder is migration-free, and the colour is heat-resistant up to 300° C.

EXAMPLE 13

A 500 ml sulphonation flask is initially charged with 122.0 g (0.702 mol) of 1,4-cyclohexanedicarboxylic acid, which are heated to 195° C. After the acid has melted, 4.0 g (0.005 mol) of sulphorhodamine B (C.I. Acid Red 52, Aldrich 75%) are added thereto.

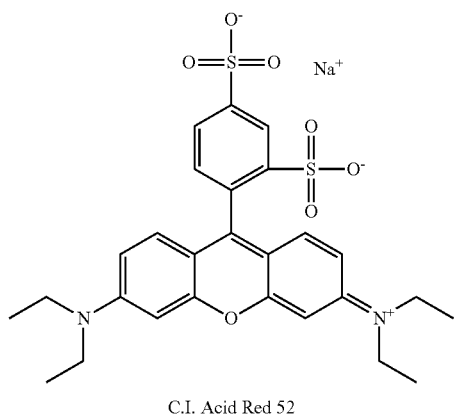 [SMILES: CCN(CC)c1ccc2c(-c3ccc(S(=O)(=O)[O-])cc3S(=O)(=O)[O-])c3ccc(=[N+](CC)CC)cc-3oc2c1 ; [Na+]]

C.I. Acid Red 52

Nitrogen is blown through. 60.3 g (0.351 mol) of isophoronediamine and 21.8 g (0.351 mol) of ethylene glycol are added dropwise within 20 minutes. The mixture is stirred at 210° C. under nitrogen for a further 3 hours. The viscous material is poured out and solidified, and the brittle material is ground by means of a rotor mill. This results in 180.2 g of a fine magenta-coloured powder ($T_g$=~135°). HDPE coloured with 1% of this powder is migration-free, and the colour is heat-resistant up to 280-300° C.

EXAMPLE 14

The procedure is analogous to Example 13. 12.4 g (0.071 mol) of 1,4-cyclohexanedicarboxylic acid are initially charged and heated to 190° C. After the acid has melted, 0.7 g (0.001 mol) of sulphorhodamine G (C.I. Acid Red 50, Aldrich, dye content 60%) is added,

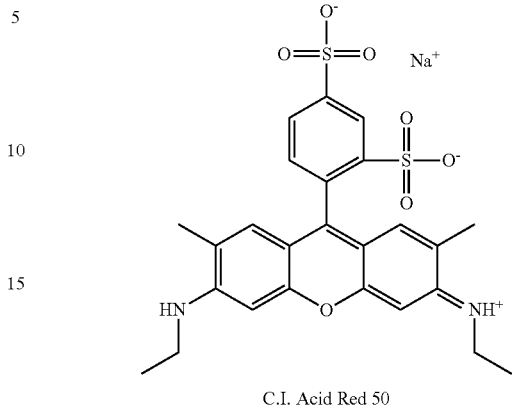

C.I. Acid Red 50 and then 6.0 g (0.035 mol) of isophoronediamine and 2.2 g (0.035 mol) of ethylene glycol are added dropwise. The mixture is stirred under nitrogen at 200° C. for a further 3 hours. The viscous material is poured out and solidified, and the brittle material is ground by means of a rotor mill. This results in 18 g of a fine, red-fluorescing powder. HDPE coloured with 1% of this powder is migration-free, and the colour is heat-resistant up to 280-300° C.

EXAMPLE 15

2.9 g (0.010 mol) of 3,4-benzoxanthenedicarboxylic anhydride (BXDA, preparable according to Journal of the Society of Dyers and Colourists 105, 29 [1989]), 2.1 g (0.0116 mol) of dimethyl 5-aminoisophthalate (Fluka purum) and 0.1 g (0.0005 mol) of zinc acetate dihydrate (Fluka purum) in 25 g of imidazole (Fluka purum) are heated to 200° C. After stirring for one hour, the mixture is cooled to 23° C. and the reaction mixture is added to ice-water. Aqueous 1M hydrochloric acid is slowly added until a yellow solid precipitates out. The product of the following formula (MS/LDI-TOF: M=451) is filtered off, washed with water and dried at 60° C./5·10³ Pa:

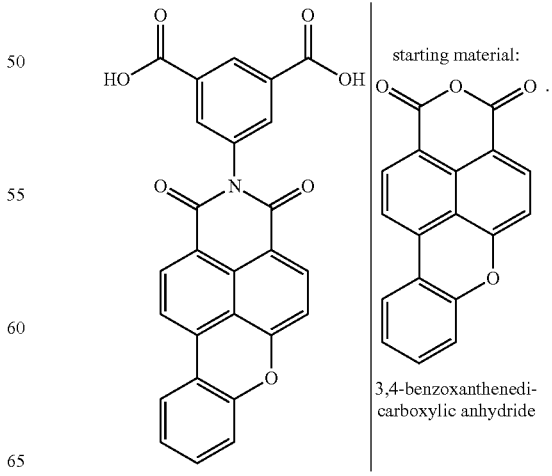

3,4-benzoxanthenedicarboxylic anhydride

EXAMPLE 16

2.4 g (0.005 mol) of the dye prepared according to Example 15, 36 g (0.210 mol) of isophoronediamine and 14.4 g (0.232 mol) of ethylene glycol are stirred slowly under nitrogen and heated to 130° C. This forms a yellow solution. After stirring for one hour, the reaction mixture is adjusted to 200° C., and 74.4 g (0.428 mol) of 1,4-cyclohexanedicarboxylic acid are added thereto. The mixture is stirred under a nitrogen flow at 200° C. for a further 4 hours. The viscous material is then poured out and solidified, and ground by means of a rotor mill. This results in 106 g of a fine, yellow-fluorescing powder ($T_g$=~129° C.). HDPE coloured with 1% of this powder is migration-free, and the colour is heat-resistant up to 300° C.

EXAMPLE 17

1.4 g (0.005 mol) of BXDA are mixed with 1.85 g (0.015 mol) of N-hydroxymethyl-chloroacetamide (ABCR, 98%), and introduced within 10 minutes into 30 ml of 95-97% technical-grade sulphuric acid at 0° C. After 12 hours at 0° C., the reaction mixture is poured onto 50 ml of ice/water. The yellow precipitate is stirred at 15° C. for 30 minutes and filtered off. The material filtered off is washed to neutrality with water and dried at 50° C./5·10³ Pa. 2.2 g of a yellow dye are obtained. This is a mixture which contains predominantly (64%) disubstituted product of the formula

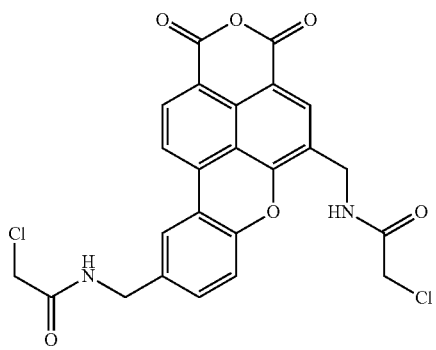 [SMILES: O=C(CCl)NCc1ccc2oc3c(CNC(=O)CCl)cc4c(=O)oc(=O)c5ccc(c2c1)c3c54]

(64% M=498, LC/MS APCI pos.) and also some (20%) trisubstituted product (M=602, HPLC/MS APCI pos.) of unknown substitution pattern. This dye mixture is used without further purification.

EXAMPLE 18

0.4 g (0.001 mol) of the dye prepared according to Example 17, 6.0 g (0.035 mol) of isophoronediamine and 2.4 g (0.038 mol) of ethylene glycol are stirred slowly under nitrogen and heated to 130° C. This forms a yellow solution. After stirring for one hour, the reaction mixture is adjusted to 200° C., and 12.4 g (0.071 mol) of 1,4-cyclohexanedicarboxylic acid are added thereto. The mixture is stirred under a nitrogen flow at 200° C. for a further 4 hours. The viscous material is then poured out and solidified, and is ground by means of a rotor mill. This results in 16 g of a fine, yellow-fluorescing powder ($T_g$=~155° C.). HDPE coloured with 1% of this powder is migration-free, and the colour is heat-resistant up to 280° C.

EXAMPLE 19

4.3 g (0.015 mol) of BXDA are introduced within 15 minutes into 43 ml of chlorosulphonic acid (Fluka purum) at 10-15° C. The orange-brown solution is stirred at 23° C., cooled to 0° C. after 30 minutes and discharged onto 1000 g of ice. The yellow suspension is stirred briefly at 0° C. and filtered. The material filtered off is once again slurried in 500 ml of ice-water and filtered cold. This intermediate is then added to a solution of 7.2 ml (0.117 mol) of ethanolamine (Fluka purum) in 150 ml of water at 10° C. This results in a fine yellow suspension. The mixture is stirred at 23° C. for a further 18 h. The yellow product is filtered off, washed to neutrality with water and dried at 60° C./5·10³ Pa. The product is a disubstituted product of unknown exact substitution pattern, which, according to analysis, probably corresponds to the formula

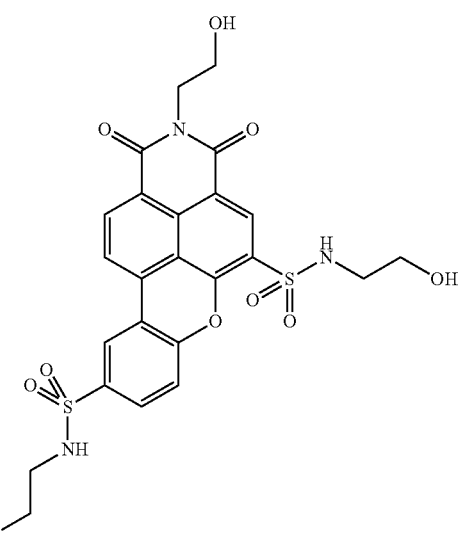

(M=577, 97% HPLC/MS APCI pos). This colourant is used without further purification.

By shortening the reaction time, it is also possible to prepare the monosubstituted product, which, according to analysis, probably corresponds to the formula

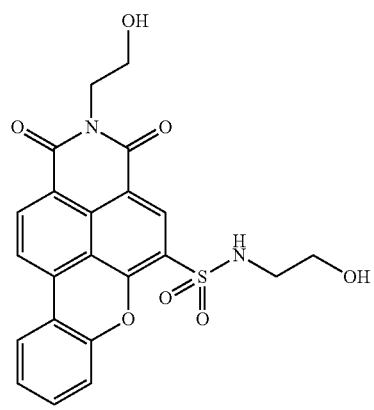 [SMILES: O=c1c2ccc3c4ccccc4oc4c(S(=O)(=O)NCCO)cc(c(=O)n1CCO)c2c43]

(M=454, 99% HPLC/MS APCI pos).

EXAMPLE 20

0.4 g (0.001 mol) of the disubstituted dye prepared according to Example 19, 6.0 g (0.035 mol) of isophoronediamine and 2.4 g (0.038 mol) of ethylene glycol are stirred slowly under nitrogen and heated to 130° C. This forms a yellow solution. After stirring for one hour, the reaction mixture is adjusted to 200° C., and 12.4 g (0.071 mol) of 1,4-cyclohexanedicarboxylic acid are added. The mixture is stirred further under a nitrogen flow at 200° C. for 4 hours. The viscous material is then poured out and solidified, and is ground by means of a rotor mill. 15.8 g of a fine, yellow-fluorescing powder are obtained ($T_g$=~131° C.). HDPE coloured with 1% of this powder is migration-free, and the colour is heat-resistant up to 300° C.

EXAMPLE 21

The procedure is analogous to Example 11. 12.4 g (0.071 mol) of 1,4-cyclohexanedicarboxylic acid and 0.4 g (0.001 mol) of the monosubstituted dye prepared according to Example 19 are initially charged and heated to 190° C. After the acid has melted, 6.0 g (0.035 mol) of isophoronediamine and 2.4 g (0.038 mol) of ethylene glycol are added dropwise. The mixture is stirred under nitrogen at 200° C. for a further three hours. The viscous material is poured out and solidified, and the brittle material is ground by means of a rotor mill. This results in 20 g of a fine, yellow-fluorescing powder. HDPE coloured with 1% of this powder is migration-free, and the colour is heat-resistant up to 280-300° C.

EXAMPLE 22

Analogously to Example 10, 0.51 g (0.002 mol) of 4-chloro-1,8-naphthalic anhydride (ABCR, 94%) and 8.3 g (0.048 mol) of isophoronediamine are stirred slowly under nitrogen and heated to 150° C. After stirring for 1 hour, the reaction mixture has turned yellow. 0.05 g (corresponds to about 10% by weight of the dye) of 2,6-diethyl-2,3,6-trimethyl-4-piperidinol (preparable according to WO 2006/024 621) is added.

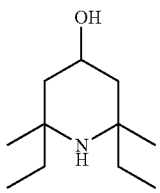

2,6-diethyl-2,3,6-trimethyl-4-piperidinol 2,6-diethyl-2,3,6-trimethyl-4-piperidinol This mixture is then added dropwise to a molten mixture of 18.6 g (0.107 mol) of 1,4-cyclohexanedicarboxylic acid and 3.6 g (0.058 mol) of ethylene glycol at 150° C. The reaction mixture is heated to 200° C. and stirred for a further 2 h. The viscous material is then poured out and solidified, and is ground. This results in 24.5 g of a fine, yellow-fluorescing powder. HDPE coloured with 1% of this powder is migration-free, and the colour is heat-resistant up to 300° C.

EXAMPLE 23

Analogously to Example 1, 12.4 g (0.071 mol) of 1,4-cyclohexanedicarboxylic acid is melted slowly at 190° C. 0.4 g (0.001 mol) of compound of the formula

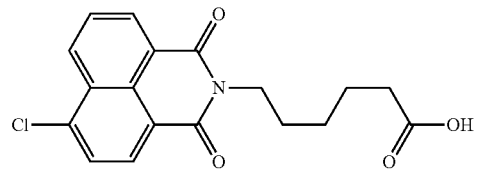

is added thereto, and nitrogen is blown through. A mixture of 6.0 g (0.035 mol) of isophoronediamine and 2.4 g (0.038 mol) of ethylene glycol is added dropwise within 5 minutes, and the reaction mixture is stirred under a nitrogen flow at 200° C. over the course of 2 hours. 1.5 g of CH IMASSORB 944 (®, BASF; CAS-No. 71878-19-8, poly[[6-(1,1,3,3-tetramethyl-butylaminoFs-triazine-2,4-diyl]-[(2,2,6,6-tetramethyl-4-piperidyl)imino]-hexamethylene-[(2,2,6,6-tetramethyl-4-piperidyl)imino]]) are added thereto, and the mixture is stirred at 200° C. over the course of a further 1 h. The viscous material is then poured out and solidified, and is ground by means of a rotor mill. This results in 18.8 g of a fine, yellow-fluorescing powder ($T_g$=~139° C.). HDPE coloured with 1% of this powder is migration-free, and the colour is heat-resistant up to 300° C.

EXAMPLE 24

The procedure is as in Example 23, except that only 30 mg of CHIMASSORB 944 (®, BASF) are added. This results in 18.6 g of a fine, yellow-fluorescing powder. HDPE coloured with 1% of this powder is migration-free, and the colour is heat-resistant up to 300° C.

EXAMPLE 25

The procedure is as in Example 23, except that only 0.3 g of CHIMASSORB 944 (®, BASF) are added. This results in 18.6 g of a fine, yellow-fluorescing powder. HDPE coloured with 1% of this powder is migration-free, and the colour is heat-resistant up to 280° C.

EXAMPLE 26

The procedure is as in Example 23, except that CHIMASSORB 944 (®, BASF) is not added until shortly before completion of the reaction, then the mixture is stirred for a further 10 minutes. This results in 18.6 g of a fine, yellow-fluorescing powder. HDPE coloured with 1% of this powder is migration-free, and the colour is heat-resistant up to 300° C.

EXAMPLE 27

The procedure is as in Example 23, except that 1.5 g of TINUVIN 783 (®, BASF; TINUVIN 783 is a mixture of CHIMASSORB 944 and TINUVIN 622) are added instead of CHIMASSORB 944 (®, BASF). This results in 18.6 g of a fine, yellow-fluorescing powder. HDPE coloured with 1% of this powder is migration-free, and the colour is heat-resistant up to 300° C.

EXAMPLE 28

The procedure is as in Example 24, except that IRGANOX 1010 (®, BASF; tetrakis-[3-(3,5-di-tert-butyl-4-hydroxyphenyl)-propionyloxymethyl]-methane)

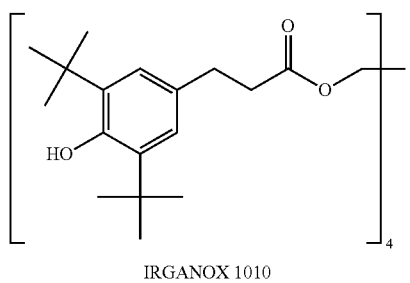

IRGANOX 1010 is added instead of CHIMASSORB 944 (®, BASF). This results in a fine, yellow-fluorescing powder. HDPE coloured with 1% of this powder is migration-free, and the colour is heat-resistant up to 300° C.

EXAMPLE 29

The procedure is as in Example 25, except that a mixture of 0.15 g TINUVIN 783 (®, BASF) and 0.15 g IRGANOX 1010 (®, BASF) is added instead of 0.3 g CHIMASSORB 944 (®, BASF). This results in a fine, yellow-fluorescing powder. HDPE coloured with 1% of this powder is migration-free, and the colour is heat-resistant up to 300° C.

EXAMPLE 30

The procedure is as in Example 29, except that only 0.015 g of TINUVIN 783 (®, BASF) and 0.015 g of IRGANOX 1010 (®, BASF) are added. This results in a fine, yellow-fluorescing powder. HDPE coloured with 1% of this powder is migration-free, and the colour is heat-resistant up to 300° C.

EXAMPLE 31

The procedure is as in Example 26, except that 4.0 g (0.004 mol) of sulphorhodamine G (C.I. Acid Red 52, Aldrich 60%) are used instead of the compound of the formula

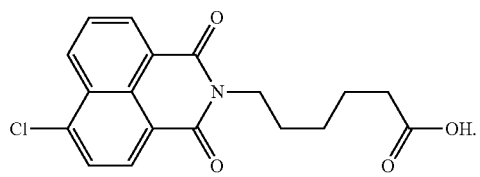 [SMILES: O=C(O)CCCCCN1C(=O)c2cccc3c(Cl)ccc(c23)C1=O]

This results in a fine, red-magenta-fluorescing powder. HDPE coloured with 1% of this powder is migration-free, and the colour is heat-resistant up to 300° C.

EXAMPLE 32

A 750 ml sulphonation flask is initially charged with 400 ml of chlorosulphonic acid, and 38 g (0.080 mol) of C.I. Solvent Blue 104 (Sandoplast Blue 2BP®, Clariant) is stirred in small portions within 15 minutes,

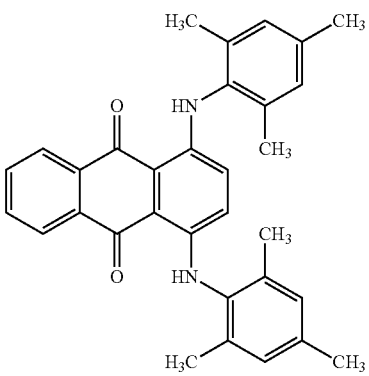

C.I. Solvent Blue 104 in the course of which the temperature of the reaction mixture rises up to 35° C. The mixture is stirred at 23° C. for another 6 hours, then the reaction mixture is stirred into 1200 ml of an ice-water mixture within 30 minutes, with additional external cooling with an ice-methanol mixture. In the course of this, a portion of the product already precipitates out in the form of blue-black crystals. The mixture is stirred at 0° C. for a further 30 minutes; 200 ml of the stirred suspension are filtered off and dried at 30° C./5·$10^3$ Pa for 15 hours. This results in 6.0 g of dark blue crystals of the formula

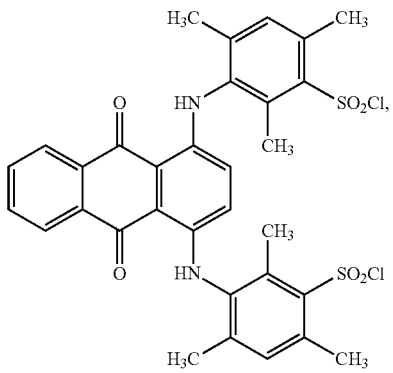 [SMILES: Cc1cc(C)c(S(=O)(=O)Cl)c(C)c1Nc1ccc(Nc2c(C)cc(C)c(S(=O)(=O)Cl)c2C)c2c1C(=O)c1ccccc1C2=O]

which are used as the dye for the copolymerization described in Example 33. The remaining aqueous suspension is transferred to a separating funnel, 400 ml of ethyl acetate are added and the product is transferred to the organic phase by shaking. This solution is used directly to prepare the sulphonamides which are described in Examples 34 and 37.

EXAMPLE 33

In a 150 ml sulphonation flask, with nitrogen purging, 31.0 g (0.180 mol) of cyclohexanedicarboxylic acid are heated to 200° C., and 2.5 g (0.005 mol) of the dye according to Example 32 (of the 6 g of dark blue crystals described therein) are added, the mixture is stirred at the same temperature for 5 minutes, and then 5.6 g (0.090 mol) of ethylene glycol and 15.3 g (0.089 mol) of isophoronediamine are added. The reaction mixture is kept at 200° C. while stirring for 3 hours, poured out, cooled to 23° C. and comminuted mechanically to give a fine, dark blue powder, which gives 46.0 g of copolycondensate. HDPE coloured with 1% of this powder is migration-free, and the colour is heat-resistant up to 280° C.

EXAMPLE 34

150 ml of the dye solution in ethyl acetate described in Example 32 are initially charged in a 350 ml sulphonation flask. After cooling to 10° C., 6.1 g (0.100 mol) of ethanolamine are stirred in within 2 minutes and the reaction solution is heated to reflux for 2 hours. Thereafter, it is cooled to 23° C. and extracted by shaking successively first with 200 ml, then twice more with 150 ml each time, of water. The organic phase is dried over anhydrous sodium sulphate and the solvent is drawn off on a rotary evaporator. 4.2 g of dark blue colourant of the formula

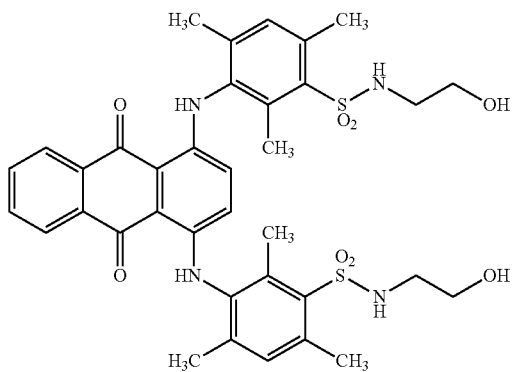 [SMILES: Cc1cc(C)c(S(=O)(=O)NCCO)c(C)c1Nc1ccc(Nc2c(C)cc(C)c(S(=O)(=O)NCCO)c2C)c2c1C(=O)c1ccccc1C2=O]

are isolated.

EXAMPLE 35

The procedure is analogous to Example 33, except that 2.5 g (0.004 mol) of the dye according to Example 34 are used. 44.8 g of copolycondensate are obtained, which, in a concentration of 2%, gives migration-free coloured HDPE, the colour of which is heat-resistant up to 280° C.

EXAMPLE 36

The procedure is analogous to Example 33, except that 4.0 g (0.006 mol) of the dye according to Example 34 are used. 47.4 g of copolycondensate are obtained, which, in concentrations of 0.625% and 0.3125%, gives migration-free coloured polypropylene, the colouration is heat-resistant up to 280° C., and, in a concentration of 0.625%, gives migration-free coloured polypropylene, the colouration is heat-resistant up to 260° C.

EXAMPLE 37

The procedure is analogous to Example 34, except that 13.5 g (0.126 mol) of 2-(2-aminoethoxy)ethanol (Fluka purum) are used instead of ethanolamine. 5.4 g of dark blue colourant of the formula

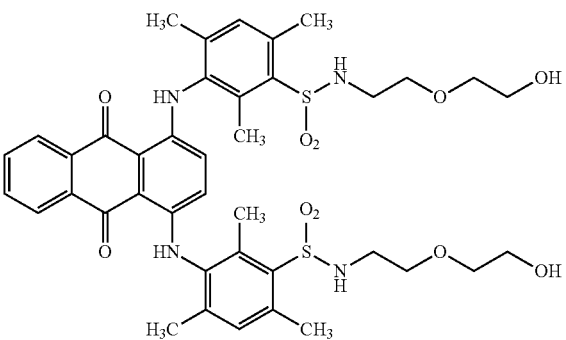

are obtained.

EXAMPLE 38

The procedure is analogous to Example 33, except that 4.0 g (0.005 mol) of the dye according to Example 37 are used. 46.4 g of copolycondensate are obtained, which, in a concentration of 0.625%, gives migration-free coloured HDPE, the colour of which is heat-resistant up to 280° C.

EXAMPLE 39

In a mortar, 4.8 g (0.010 mol) of C.I. Solvent Blue 104 (Sandoplast Blue 2BP, Clariant (®, Clariant)) and 6.2 g (0.050 mol) of N-hydroxymethyl-chloroacetamide (ABCR, 98%, CAS-No. 2832-19-1) are mixed intimately. In the meantime, a 150 ml sulphonation flask is initially charged with 50 ml of 95% sulphuric acid and cooled to 0° C. The above-described mixture of the reactants is stirred into the sulphuric acid in small portions within 30 minutes, in the course of which the reaction temperature is kept below 6° C. by cooling. The solution is stirred at 0° C. for 2 hours, then warmed to 23° C. and stirred once again for a further 4 hours. The reaction mixture is then stirred into 300 ml of water, and the blue suspension is stirred at 23° C. for a further 30 minutes, filtered and dried under reduced pressure ($5 \cdot 10^3$ Pa). 8.0 g of dark blue copolycondensate are obtained. According to combined HPLC/MS analysis, the product consists predominantly of the compound of the formula

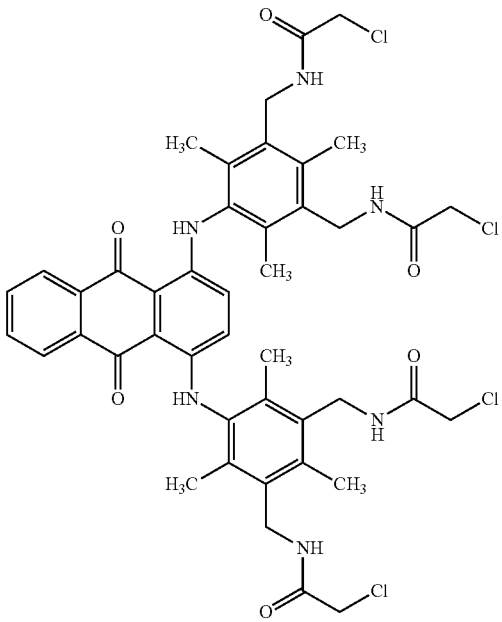 [SMILES: Cc1c(CNC(=O)CCl)c(C)c(Nc2ccc(Nc3c(C)c(CNC(=O)CCl)c(C)c(CNC(=O)CCl)c3C)c3c2C(=O)c2ccccc2C3=O)c(C)c1CNC(=O)CCl]

(four-fold reaction of the anthraquinone with methylolchloroacetamide), in addition to small amounts of compounds with only 2- and 3-fold conversion of methylolchloroacetamide.

EXAMPLE 40

The procedure is analogous to Example 33, except that 4.0 g (0.005 mol) of the colourant according to Example 39 are used. 46.8 g of copolycondensate are obtained, which, in a concentration of 0.625%, gives migration-free coloured HDPE, the colour of which is heat-resistant up to 280° C.

EXAMPLE 41

The procedure is analogous to Example 33, except that 2.5 g (0.005 mol) of C.I. Acid Blue 80 (Polar Blau RAWL, Huntsman Textile Effects (®, Huntsman)) are used.

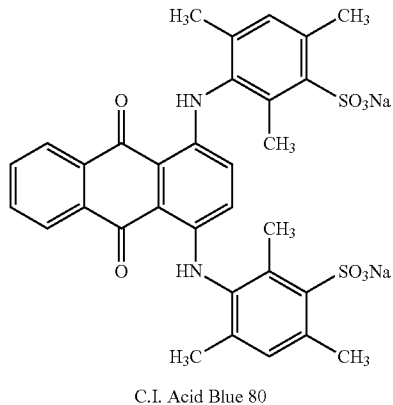

C.I. Acid Blue 80

47.1 g of copolycondensate are obtained, which, in a concentration of 1.25%, gives migration-free coloured HDPE, the colouration is heat-resistant up to 260° C.

EXAMPLE 42

1.42 g (0.002 mol) of bis(N-(2,6-diisopropylanilino)) perylenetetra-carboximide (Lumogen F Orange 240, BASF (®, BASF))

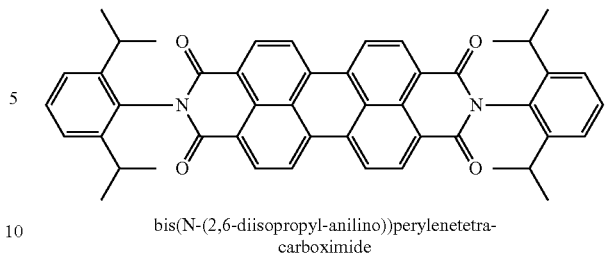

bis(N-(2,6-diisopropyl-anilino))perylenetetra-carboximide are mixed intimately with 1.83 g (0.007 mol) of 1-(2',3'-dibromopropionylamino)-1-hydroxyacetic acid (

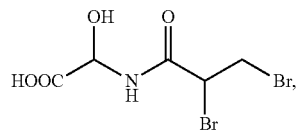 [SMILES: O=C(NC(O)C(=O)O)C(Br)CBr]

preparable according to WO 81/01009) in a mortar, then the mixture is stirred into 12 ml of 95% sulphuric acid in a 50 ml 2-neck flask while cooling at 10-15° C. within 15 minutes. The reaction mixture is then brought to 23° C., stirred at this temperature for 23 hours and finally poured gradually (approximately 10 minutes) onto 36 g of ice. The red suspension is stirred for another 10 minutes, in the course of which the temperature reaches 15° C., then filtered off and washed to neutrality (pH ~6) with 200 ml of water. After drying at 60° C./5·10³ Pa, 2.28 g of colourant are obtained; according to mass spectroscopy and proton resonance spectroscopy, the compound is predominantly one of the formula

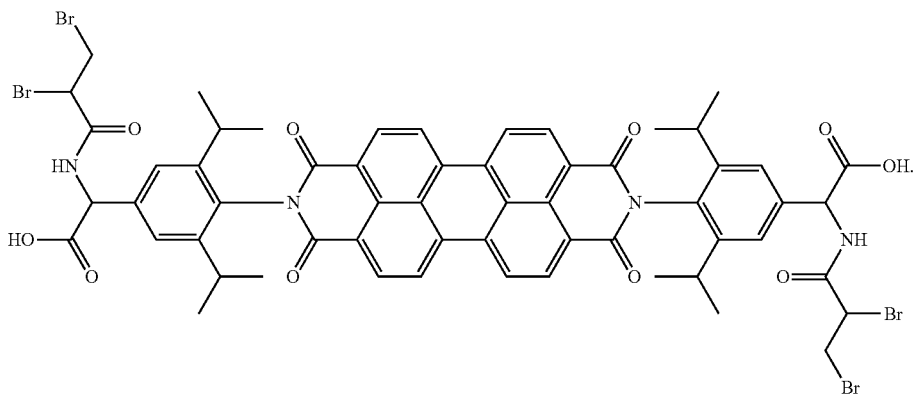 [SMILES: CC(C)c1cc(C(NC(=O)C(Br)CBr)C(=O)O)cc(C(C)C)c1N1C(=O)c2ccc3c4ccc5c6c(ccc(c7ccc(c2c37)C1=O)c64)C(=O)N(c1c(C(C)C)cc(C(NC(=O)C(Br)CBr)C(=O)O)cc1C(C)C)C5=O]

EXAMPLE 43

The procedure is analogous to Example 33, except that 1.0 g (0.001 mol) of the colourant according to Example 42 is used. In a modification to the method described there—retaining the amounts of reactants stated—the dye is also first reacted solely with isophoronediamine at 150° C. over the course of 2 hours, before ethylene glycol and cyclohexanedicarboxylic acid are added, the reaction temperature is increased to 200° C. and the mixture is stirred at this temperature for 3 hours. 43.6 g of copolycondensate are obtained, which, in a concentration of 1%, gives migration-free coloured HDPE.

EXAMPLE 44

In a 50 ml sulphonation flask, while purging with nitrogen, 20.9 g (0.120 mol) of cyclohexanedicarboxylic acid are heated to 200° C., and 9.0 g (0.013 mol) of the dye according to Example 34 are added, the mixture is stirred at the same temperature for 5 minutes, and then 3.4 g (0.054 mol) of ethylene glycol and 9.2 g (0.054 mol) of isophoronediamine are added within 15 min. The reaction mixture is kept at 200° C. while stirring for 4 hours, poured out, cooled to 23° C. and comminuted mechanically to give a fine dark blue powder, which gives 34.0 g of copolycondensate. Coloured PP containing 0.1% and 0.2% of this powder is migration-free and the colour is heat-resistant up to 260° C.

EXAMPLE 45

The procedure is analogous to Example 44, except that 20.2 g (0.116 mol) of cyclohexanedicarboxylic acid and 6.0 g (0.009 mol) of the dye according to Example 34 are used. 30.1 g of copolycondensate are obtained, which, in a concentration of 0.3%, gives migration-free coloured PP, the colour of which is heat-resistant up to 260° C.

COMPARATIVE EXAMPLE 1

According to Example 14 of U.S. Pat. No. 6,103,006

A mixture of 1.9 parts of water, 0.01 part of a silicone defoamer (silicone antifoam, 30% aqueous emulsion, Fluka), 11.3 parts (0.066 mol) of isophoronediamine (Aldrich 99%), 3.3 parts (0.023 mol) of cyclohexanedimethanol (Janssen 99%), 6.3 parts (0.028 mol) of azeleic acid (Fluka techn.), 11.0 parts (0.065 mol) of isophthalic acid (Fluka purum) and 0.6 part (0.002 mol) of 3,4-benzoxanthenedicarboxylic anhydride (BXDA, preparable according to J. Soc. Dyers Col. 105, 29 [1989]) is heated to 260° C., then cooled to 230° C. within 1½ hours. The polymerized pigment formed is discharged onto a metal sheet and, after cooling to 23° C., ground ($T_g$=~129° C.). The colour of coloured HDPE containing 1% of this polymerized pigment is relatively heat-resistant, but not migration-free.

COMPARATIVE EXAMPLE 2

According to Example 1 of U.S. Pat. No. 6,103,006

5.3 g (0.045 mol) of 1,5-diamino-2-methylpentane (Fluka purum), 10.9 g (0.075 mol) of 1,4-cyclohexanedimethanol (Janssen 99%), 18.9 g (0.113 mol) of isophthalic acid (Fluka purum), 0.52 g (0.001 mol) of a polyethylene monoalcohol (Aldrich, $M_n$~460) and 0.7 g (0.002 mol) of BXDA are heated to 220° C. under nitrogen flow. The mixture is stirred at 220° C. for 2 hours. The viscous material is then poured out, solidified and ground by means of a rotor mill. 28.1 g of a fine yellow powder are obtained ($T_g$=~92° C.). The colour of coloured HDPE containing 1% of this powder is heat-resistant, but not migration-free.

COMPARATIVE EXAMPLE 3

According to Example 3 of WO 2005/019523

A mixture of 8.2 parts (0.002 mol) of 2-(3-hydroxypropyl)-6-[(3-hydroxypropyl)amino]-1H-benz[de]isoquinoline-1,3 (2H)-dione [CAS Reg. No. 52821-24-6],

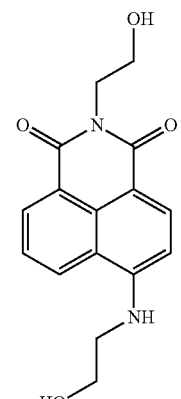

CAS-No. 52821-24-6

17 parts (0.098 mol) of 1,4-cyclohexanedicarboxylic acid (cis/trans mixture, Aldrich 99%), 5.4 parts (0.037 mol) of cyclohexanedimethanol, 0.6 part (0.019 mol) of methanol and 6.4 parts (0.037 mol) of isophoronediamine is heated to 230° C. for 3 hours, in the course of which water is separated out. The product formed is discharged onto a metal sheet and, after cooling to 23° C., ground. 36.5 g of a yellow-orange powder are obtained ($T_g$=~125° C.). The colour of coloured HDPE containing 1% of this powder is substantially migration-free and heat-resistant, but is not fluorescent.

COMPARATIVE EXAMPLE 4

According to Example 7 of WO 2005/019523

A mixture of 8.1 parts (0.056 mol) of cyclohexanedimethanol, 0.9 part (0.028 mol) of methanol, 3.2 parts (0.019 mol) of isophoronediamine and 15.5 parts (0.089 mol) of 1,4-cyclohexanedicarboxylic acid (cis/trans mixture) is heated to 220° C., then cooled to 185° C. after 2 hours. Subsequently, 3.4 parts (0.001 mol) of 1,4-di(3'-hydroxypropylamino)anthraquinone (

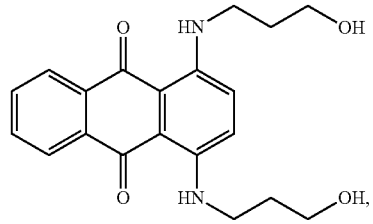 [SMILES: O=C1c2ccccc2C(=O)c2c(NCCCO)ccc(NCCCO)c21]

preparable according to Eur. J. Med. Chem. 34/7-8, 597-616 [1999]) and 0.2 part (0.0003 mol) of butyltin tris(2-ethylhexanoate) (transesterification catalyst, Aldrich 95%, CAS-No. 23850-94-4) are added. After 2 hours at 190° C., the product formed is discharged onto a metal sheet and, after cooling to 23° C., mechanically comminuted. 24.9 g of a dark blue powder are obtained. The colour of coloured HDPE containing 0.5% and 0.025% of this powder is heat-resistant only up to 260° C. and exhibits relatively high migration, which is not tolerable, for example, for packaging.

Further Test Results

PVC:

PVC films containing the copolycondensates according to Examples 1 to 31 exhibit intense fluorescence and no migration.

"Rolled HDPE":

films containing the copolycondensates according to Example 1 to 31 exhibit intense fluorescence and no migration.

"Rolled LDPE":

films containing the copolycondensates according to Examples 1, 11 and 12 exhibit intense yellow fluorescence and no migration.

Injection-Moulded HDPE:

blanks containing the copolycondensates according to Examples 1 to 31 exhibit intense fluorescence. They are heat-resistant up to 280-300° C. and do not exhibit any migration (to DIN 53775, part 3).

Injection-Moulded Polypropylene:

blanks containing the copolycondensates according to Examples 1 to 31 exhibit intense fluorescence. They are heat-resistant up to 280-300° C. and do not exhibit any migration (to DIN 53775, part 3).

EXAMPLES 46-64

Selected copolycondensates were tested in the polymers which follow. This was done by processing the copolycondensates directly in the desired concentration of 1% by weight of a TSE compounder from Leistritz. All colours are heat-resistant and migration-free at all temperatures specified below, migration being measured in each case under more severe test conditions after 24, 48, 72 and 96 hours of storage at the test temperature:

| Polymer | Copolycondensate according to examples | Test temperatures for heat stability | Test temperatures for migration |
|---|---|---|---|
| HDPE M80063S (Sabic) | 1, 11, 12, 13, 16 | 200° C.-300° C. | 200° C., 220° C., 240° C., 260° C., 280° C., 300° C. |
| LDPE Lupolen 1840D (RTM, Lyondell-Basell) | 1, 11, 12, 13, 16 | 140° C.-200° C. | 140° C., 160° C., 180° C., 200° C. |
| PP RD360 MO (Borealis) | 1, 11, 12, 13, 16 | 200° C.-300° C. | 200° C., 220° C., 240° C., 260° C., 280° C., 300° C. |
| PET Arnite D04/300 (DSM) | 1 | 270° C.-300° C. | 200° C. |
| PMMA Plexiglas N6 (RTM, Degussa) | 1 | 200° C. | 200° C. |
| SAN Tyril 905 (DOW) | 1 | 200° C. | 200° C. |
| SURLYN 8140 (RTM, DuPont) | 1 | 200° C. | 200° C. |

The invention claimed is:

1. A copolycondensate obtained by copolycondensation of
at least one 1,2-$C_4$-$C_8$cycloalkanedicarboxylic acid, 1,3-$C_4$-$C_8$cycloalkanedicarboxylic acid or 1,4-$C_4$-$C_8$cycloalkanedicarboxylic acid, or an ester, anhydride or acid chloride thereof;

from 0.3 to 0.8 mol, based on 1 mol of $C_4$-$C_8$cycloalkanedicarboxylic acid, of at least one 1,2-$C_6$-$C_{12}$-cycloalkanediamine, 1,3-$C_6$-$C_{12}$cycloalkanediamine or 1,4-$C_6$-$C_{12}$cycloalkanediamine, or of a latent form thereof;

from 0.2 to 0.6 mol, based on 1 mol of $C_4$-$C_8$cycloalkanedicarboxylic acid, of at least one 1,2-$C_2$-$C_6$-alkanediol, 1,3-$C_2$-$C_6$alkanediol or 1,4-$C_2$-$C_6$alkanediol, of which from 0 to 0.05 mol of one hydroxyl group may be esterified with a monocarboxylic acid, where the $C_2$-$C_6$alkanediol may be uninterrupted or interrupted by —O—, with the proviso that no carbon atom of the $C_2$-$C_6$alkanediol is bonded to more than one oxygen atom;

optionally from 0 to 0.1 mol, based on 1 mol of $C_4$-$C_8$cycloalkanedicarboxylic acid, of one or more amino acids;

optionally from 0 to 0.1 mol, based on 1 mol of $C_4$-$C_8$cycloalkanedicarboxylic acid, of one or more monofunctional components selected from the group consisting of monoalcohols, primary monoamines and monoacids each containing from 1 to 18 carbon atoms; and from 0.001 to 0.15 mol, based on 1 mol of $C_4$-$C_8$cycloalkanedicarboxylic acid, of at least one colourant which has at least two chlorosulphonyl groups, at least two 4-chloro-3-oxo-2-azabutyl groups, a 3,5-dicarboxyphenyl group or both a reactive chlorine or bromine and a carboxyl, hydroxyl or amino group bonded to the chromophore of the colourant by an aliphatic chain containing at least 4 members selected from the group consisting of methylene, oxy, carbonyl, sulpho and amino, with the proviso that at least two of these substituents must be removed from one another to such an extent that they are not condensable with one another to form a fewer than 10-membered intramolecular ring;

with the proviso that the molar ratio of the total amount of all hydroxyl and primary amino groups or latent forms thereof to the total amount of all carboxyl and sulpho groups is from 5:4 to 4:5.

2. A copolycondensate according to claim 1, in which the colourant has an absorption maximum in the range from 300 to 500 nm and luminescences in the range between 400 and 700 nm, has an absorption maximum in the range between 500 and 600 nm or has an absorption maximum in the range from 600 to 700 nm, and the corresponding absorption maximum has a molar absorption coefficient $Kn \geq 1 \cdot 10^4 \, l \cdot mol^{-1} \cdot cm^{-1}$.

3. A copolycondensate according to claim 1, in which the colourant has a substructure

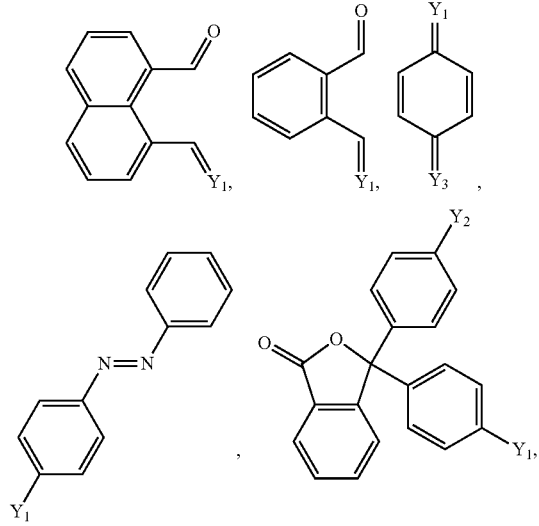

-continued

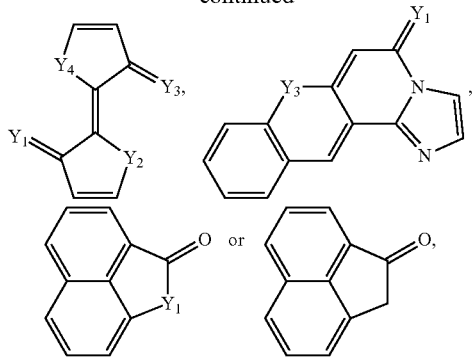

in which $Y_1$ and $Y_2$ are each independently O or N— and $Y_3$ and $Y_4$ are each independently O, N— or S.

4. A copolycondensate according to claim 1, characterized in that it has a glass transition temperature (Tg) of 60 to 200° C.

5. A process for preparing a copolycondensate, wherein
at least one 1,2-$C_4$-$C_8$cycloalkanedicarboxylic acid, 1,3-$C_4$-$C_8$cycloalkanedicarboxylic acid or 1,4-$C_4$-$C_8$cycloalkanedicarboxylic acid, or an ester, anhydride or acid chloride thereof;
from 0.3 to 0.8 mol, based on 1 mol of $C_4$-$C_8$cycloalkanedicarboxylic acid, of at least one 1,2-$C_6$-$C_{12}$-cycloalkanediamine, 1,3-$C_6$-$C_{12}$cycloalkanediamine or 1,4-$C_6$-$C_{12}$cycloalkanediamine, or of a latent form thereof;
from 0.2 to 0.6 mol, based on 1 mol of $C_4$-$C_8$cycloalkanedicarboxylic acid, of at least one 1,2-$C_2$-$C_6$-alkanediol, 1,3-$C_2$-$C_6$alkanediol or 1,4-$C_2$-$C_6$alkanediol, of which from 0 to 0.05 mol of one hydroxyl group may be esterified with a monocarboxylic acid, where the $C_2$-$C_6$alkanediol may be uninterrupted or interrupted by —O—, with the proviso that no carbon atom of the $C_2$-$C_6$alkanediol is bonded to more than one oxygen atom;
optionally from 0 to 0.1 mol, based on 1 mol of $C_4$-$C_8$cycloalkanedicarboxylic acid, of one or more amino acids;
optionally from 0 to 0.1 mol, based on 1 mol of $C_4$-$C_8$cycloalkanedicarboxylic acid, of one or more monofunctional components selected from the group consisting of monoalcohols, primary monoamines and monoacids each containing from 1 to 18 carbon atoms; and
from 0.001 to 0.15 mol, based on 1 mol of $C_4$-$C_8$cycloalkanedicarboxylic acid, of at least one colourant which has at least two chlorosulphonyl groups, at least two 4-chloro-3-oxo-2-azabutyl groups, a 3,5-dicarboxyphenyl group or both a reactive chlorine or bromine and a carboxyl, hydroxyl or amino group bonded to the chromophore of the colourant by an aliphatic chain containing at least 4 members selected from the group consisting of methylene, oxy, carbonyl, sulpho and amino, with the proviso that at least two of these substituents must be removed from one another to such an extent that they are not condensable with one another to form a fewer than 10-membered intramolecular ring;
with the proviso that the molar ratio of the total amount of all hydroxyl and primary amino groups or latent forms thereof to the total amount of all carboxyl and sulpho groups is from 5:4 to 4:5;

are heated to approximately 50 to 300° C. over 1 s to 100 hours at a pressure of $10^2$ to $10^7$ Pa in the presence of an acidic catalyst.

6. A process according to claim 5, in which the copolycondensate is prepared in the presence of 0 to 5000% by weight, based on the total weight of the reactants, of an inert medium.

7. A process according to claim 5, in which the copolycondensation takes place in an extruder.

8. A process according to claim 7, in which a polymeric substrate is additionally metered into the extruder.

9. A process according to claim 8 where the polymeric substrate is a polyolefin, an acrylate resin, a polyester, an unsaturated polyester resin, a polyamide, poly-p-phenylene, a polyimide or an ionomer.

10. A bulk-coloured high molecular weight organic material comprising
(a) 0.05 to 70% by weight, based on the sum of (a) and (b), of a copolycondensate according to claim 1 and
(b) 99.95 to 30% by weight, based on the sum of (a) and (b), of a high molecular weight organic material.

11. A process for bulk colouring of high molecular weight organic material, comprising incorporating therein a copolycondensate according to claim 1.

12. A copolycondensate according to claim 1, in which the colourant has a substructure

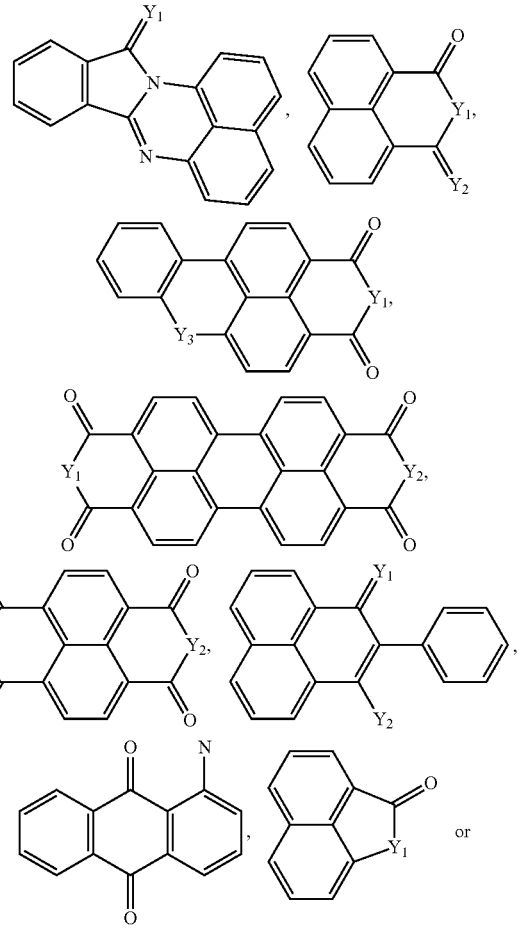

-continued

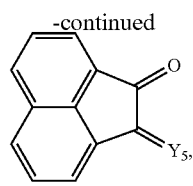

in which $Y_1$ and $Y_2$ are each independently O or N—, $Y_3$ is O, N— or S and $Y_5$ is —C— or N—.

13. A polycondensate according to claim 1, in which the colourant has a substructure

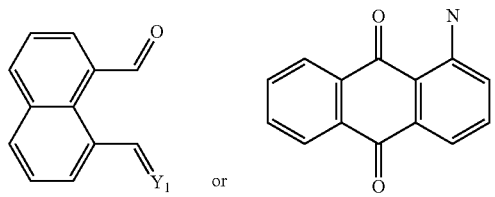

where $Y_1$ is O.

14. A polycondensate according to claim 1 wherein the at least one colourant contains at least two chlorosulphonyl groups.

15. A polycondensate according to claim 1 wherein the at least one colourant contains at least two 4-chloro-3-oxo-2-azabutyl groups.

16. A polyconsensate according to claim 1 wherein the at least one colourant contains a 3,5-dicarboxyphenyl group.

17. A polycondensate according to claim 1 wherein the at least one colourant contains both a reactive chlorine or bromine and a carboxyl, hydroxyl or amino group bonded to the chromophore of the colourant by an aliphatic chain comprising at least 4 methylene groups.

18. A polycondensate according to claim 13 wherein the at least one colourant contains at least two chlorosulphonyl groups.

19. A polycondensate according to claim 13 wherein the at least one colourant contains at least two 4-chloro-3-oxo-2-azabutyl groups.

20. A polyconsensate according to claim 13 wherein the at least one colourant contains a 3,5-dicarboxyphenyl group.

21. A polycondensate according to claim 13 wherein the at least one colourant contains both a reactive chlorine or bromine and a carboxyl, hydroxyl or amino group bonded to the chromophore of the colourant by an aliphatic chain comprising at least 4 methylene groups.

* * * * *